US011984639B2

(12) United States Patent
Igarashi et al.

(10) Patent No.: US 11,984,639 B2
(45) Date of Patent: May 14, 2024

(54) ANTENNA DEVICE AND WIRELESS COMMUNICATION APPARATUS

(71) Applicant: SONY SEMICONDUCTOR SOLUTIONS CORPORATION, Kanagawa (JP)

(72) Inventors: Takahiro Igarashi, Kanagawa (JP); Naoki Kakoiyama, Kanagawa (JP); Shuichi Oka, Kanagawa (JP); Shusaku Yanagawa, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 276 days.

(21) Appl. No.: 17/425,450

(22) PCT Filed: Dec. 13, 2019

(86) PCT No.: PCT/JP2019/048911
§ 371 (c)(1),
(2) Date: Jul. 23, 2021

(87) PCT Pub. No.: WO2020/158212
PCT Pub. Date: Aug. 6, 2020

(65) Prior Publication Data

US 2022/0102831 A1 Mar. 31, 2022

(30) Foreign Application Priority Data

Feb. 1, 2019 (JP) ................................ 2019-017038

(51) Int. Cl.
*H01Q 1/12* (2006.01)
*H01Q 9/04* (2006.01)

(52) U.S. Cl.
CPC ......... *H01Q 1/1271* (2013.01); *H01Q 9/0414* (2013.01)

(58) Field of Classification Search
CPC ...... H01Q 1/1271; H01Q 1/2283; H01Q 1/38; H01Q 9/0414; H01Q 15/0073
See application file for complete search history.

(56) References Cited

U.S. PATENT DOCUMENTS

2001/0054980 A1 12/2001 Nakamura et al.
2012/0112969 A1* 5/2012 Caballero .............. H01Q 1/243 343/702

(Continued)

FOREIGN PATENT DOCUMENTS

CN 102570027 A 7/2012
CN 202353552 U 7/2012

(Continued)

OTHER PUBLICATIONS

B.T.P.Madhav, Substrate Permittivity Effects on the Performance of Compact and Wideband Microstrip Antennas, 2015, pp. 31-40 (Year: 2015).*

(Continued)

*Primary Examiner* — Raymond R Chai
(74) *Attorney, Agent, or Firm* — CHIP LAW GROUP

(57) ABSTRACT

An antenna device and a wireless communication apparatus capable of implementing increase in bandwidth and reduction of the manufacturing cost are provided. The antenna device includes a first antenna element and a second antenna element arranged on one face side of the first antenna element. The first antenna element includes a first glass substrate and a first patch antenna provided on the first glass substrate. The second antenna element includes a second glass substrate and a second patch antenna provided on the second glass substrate. At least part of the first patch antenna faces the second patch antenna with an air gap interposed therebetween.

14 Claims, 13 Drawing Sheets

(56) References Cited

U.S. PATENT DOCUMENTS

| | | | | |
|---|---|---|---|---|
| 2013/0002491 | A1 | 1/2013 | Sabielny | |
| 2014/0266897 | A1* | 9/2014 | Jakoby | H01Q 3/44 29/601 |
| 2015/0005037 | A1 | 1/2015 | Caballero et al. | |
| 2015/0340765 | A1* | 11/2015 | Dang | H01Q 1/2208 343/893 |
| 2016/0352023 | A1* | 12/2016 | Dang | H01Q 1/48 |
| 2018/0219283 | A1* | 8/2018 | Wilkins | H01Q 5/35 |
| 2019/0260139 | A1 | 8/2019 | Jakoby et al. | |
| 2019/0363452 | A1* | 11/2019 | Ting | G02F 1/1313 |
| 2022/0200156 | A1* | 6/2022 | Sonoda | H01Q 1/1271 |
| 2022/0278452 | A1* | 9/2022 | Kim | H01Q 1/243 |

FOREIGN PATENT DOCUMENTS

| | | | | |
|---|---|---|---|---|
| CN | 103975483 | A | | 8/2014 |
| CN | 108879114 | A | | 11/2018 |
| DE | 102010006809 | A1 | | 8/2011 |
| EP | 1168492 | A1 | | 1/2002 |
| EP | 2575211 | A1 | | 4/2013 |
| GB | 2542799 | A | | 4/2017 |
| JP | 09-098016 | A | | 4/1997 |
| JP | 2000-223927 | A | | 8/2000 |
| JP | 2002-009538 | A | | 1/2002 |
| JP | 2006-229871 | A | | 8/2006 |
| JP | 2006229871 | A | * | 8/2006 |
| JP | 2006-304006 | A | | 11/2006 |
| JP | 2013-519275 | A | | 5/2013 |
| JP | 2014-501070 | A | | 1/2014 |
| JP | 2014-531843 | A | | 11/2014 |
| JP | 2018-014733 | A | | 1/2018 |
| JP | 2019-169955 | A | | 10/2019 |
| KR | 20030068846 | A | | 8/2003 |
| KR | 20050023176 | A | | 3/2005 |
| KR | 10-2013-0008007 | A | | 1/2013 |
| KR | 10-2013-0101091 | A | | 9/2013 |
| KR | 10-2014-0090165 | A | | 7/2014 |
| WO | 2000/045466 | A1 | | 8/2000 |
| WO | 2011/095144 | A1 | | 8/2011 |
| WO | 2012/061349 | A1 | | 5/2012 |
| WO | 2013/045267 | A1 | | 4/2013 |
| WO | 2017/055835 | A1 | | 4/2017 |

OTHER PUBLICATIONS

Machine Translation JP-2006229871-A (Year: 2006).*

International Search Report and Written Opinion of PCT Application No. PCT/JP2019/048911, dated Feb. 25, 2020, 12 pages of ISRWO.

* cited by examiner

ANTENNA DEVICE AND WIRELESS COMMUNICATION APPARATUS

CROSS REFERENCE TO RELATED APPLICATIONS

This application is a U.S. National Phase of International Patent Application No. PCT/JP2019/048911 filed on Dec. 13, 2019, which claims priority benefit of Japanese Patent Application No. JP 2019-017038 filed in the Japan Patent Office on Feb. 1, 2019. Each of the above-referenced applications is hereby incorporated herein by reference in its entirety.

TECHNICAL FIELD

The present disclosure relates to an antenna device and a wireless communication apparatus.

BACKGROUND ART

As an antenna device for which a patch antenna is used, an antenna device disclosed in PTL 1 is available. The antenna device disclosed in PTL 1 includes a first semiconductor substrate having a patch antenna patterned on a bottom face of a cavity portion thereof and a second semiconductor substrate covered, at part or the entirety of a face thereof on an opening side of the cavity portion including a bottom face of the cavity portion, with a conductor that serves as the ground, and has a stacked structure of the first and second semiconductor substrates.

CITATION LIST

Patent Literature

[PTL 1]
Japanese Patent Laid-Open No. 2006-229871

SUMMARY

Technical Problems

An antenna device capable of implementing increase in bandwidth and reduction of the manufacturing cost is demanded.

The present disclosure has been made in view of such a situation as described above, and it is an object of the present disclosure to provide an antenna device and a wireless communication apparatus capable of implementing increase in bandwidth and reduction of the manufacturing cost.

Solution to Problems

According to an aspect of the present disclosure, there is provided an antenna device including a first antenna element and a second antenna element arranged on one face side of the first antenna element, in which the first antenna element includes a first glass substrate and a first patch antenna provided on the first glass substrate, the second antenna element includes a second glass substrate and a second patch antenna provided on the second glass substrate, and at least part of the first patch antenna faces the second patch antenna with an air gap interposed therebetween.

According to the aspect of the present disclosure, a patch antenna having a cavity structure and a stack structure (hereinafter referred to as cavity stack structure) in which the first patch antenna and the second patch antenna are stacked with an air gap interposed therebetween is configured. Since the permittivity between the first patch antenna and the second patch antenna is suppressed low by the glass substrates and the air layer, the antenna device can transmit or receive a radio wave in a wide bandwidth with high gain. Further, the glass substrates can be panelized (upsized in area), and a greater number of first antenna elements or a greater number of second antenna elements can be obtained from one substrate in comparison with a semiconductor substrate. Consequently, the manufacturing cost of the antenna device can be reduced. The antenna device capable of implementing increase of the bandwidth and reduction of the manufacturing cost can be provided.

DESCRIPTION OF EMBODIMENTS

In the following, embodiments of the present disclosure are described with reference to the drawings. In the description of the drawings referred to in the following description, identical or similar elements are denoted by identical or similar reference signs. However, it is to be noted that attention is to be paid to the fact that the drawings are schematic and a relation between a thickness and a planar size, a ratio in thickness between layers, and so forth are different from actual ones. Accordingly, a particular thickness and a particular size are to be determined taking the following description into account. Further, it is a matter of course that a portion at which a relation or a ratio in size is different is included among the drawings.

Further, definitions of directions such as upward and downward directions in the following description are definitions used simply for the convenience of description and do not restrict the technical idea of the present disclosure. For example, it is a matter of course that the upward and downward direction is read as a leftward and rightward direction if a target is observed in rotation by 90 degrees, and the upward and downward direction is read as an inverted state if a target is observed in rotation by 180 degrees.

Further, in the following description, a direction is sometimes described using terms of an X-axis direction, a Y-axis direction, and a Z-axis direction. For example, the Z-axis direction is a thicknesswise direction of an antenna device 1 hereinafter described. The X-axis direction and the Y-axis direction are directions orthogonal to the Z-axis direction. The X-axis direction, the Y-axis direction, and the Z-axis direction are orthogonal to each other. Further, in the following description, "as viewed in top plan" signifies that an object in question is viewed from the Z-axis direction.

Further, in the present disclosure, the term "same" includes not only a completely the same case but also a substantially the same case. As the substantially the same case, for example, a case is available in which, even if there is a difference between the two, the difference remains within a range of a manufacturing error.

Embodiment 1

Figure 1:
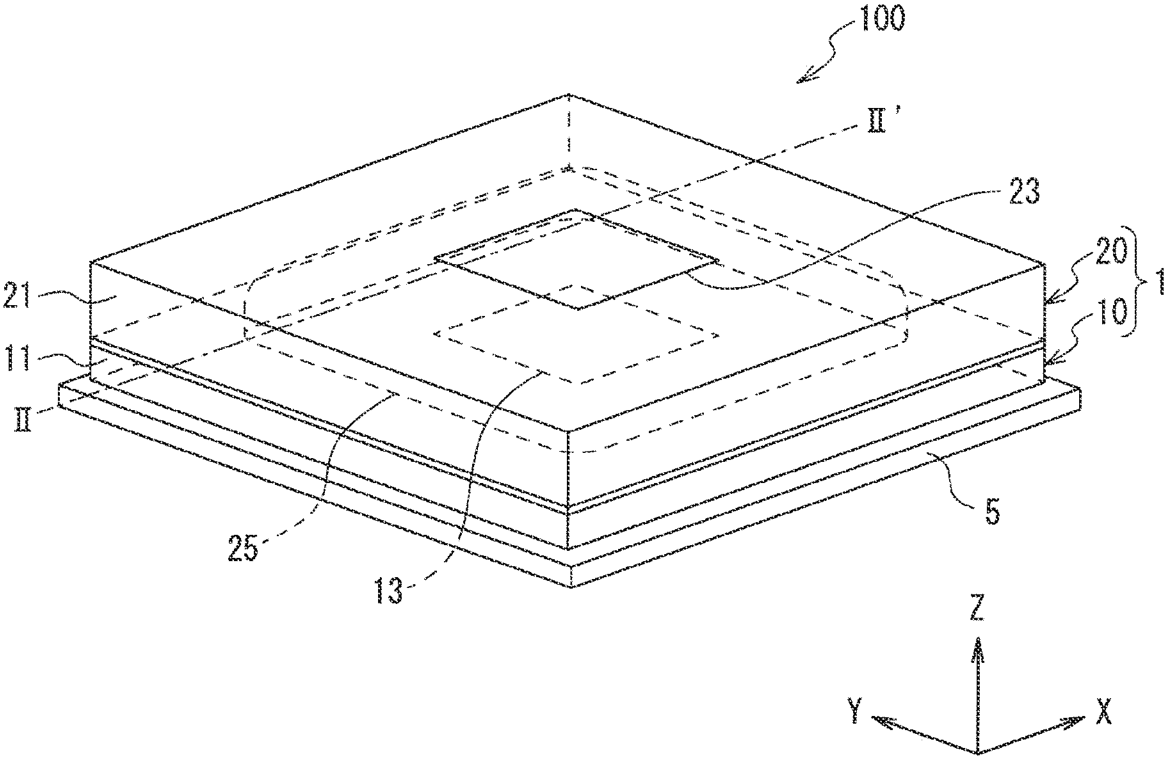
FIG. 1 is a perspective view depicting an example of a configuration of a wireless communication apparatus according to an embodiment 1 of the present disclosure.
Figure 2:
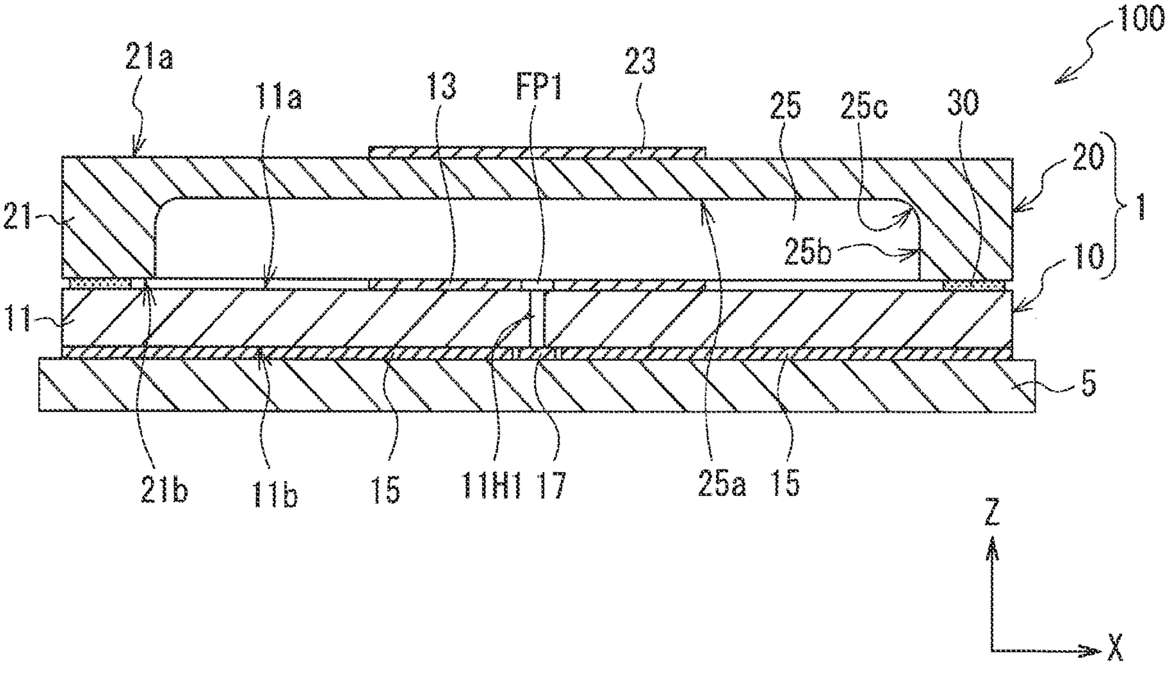
FIG. 2 is a cross sectional view depicting an example of a configuration of the wireless communication apparatus according to the embodiment 1 of the present disclosure.

FIG. 1 is a perspective view depicting an example of a configuration of a wireless communication apparatus according to an embodiment 1 of the present disclosure. FIG. 2 is a cross sectional view depicting an example of a configuration of the wireless communication apparatus according to the embodiment 1 of the present disclosure. FIG. 2 depicts a cross section taken along an X-Z plane that passes line II-II'. As depicted in FIGS. 1 and 2, a wireless communication apparatus 100 according to the embodiment 1 includes the antenna device 1 and a communication circuit board 5 on which the antenna device 1 is mounted. The antenna device 1 is a device for transmitting or receiving a radio wave, for example, in the millimeter wave region. The radio wave in the millimeter wave region signifies a radio wave having a wavelength band of a wavelength of approximately 10 mm or less.

The antenna device 1 includes a first antenna element 10 and a second antenna element 20 arranged on one face side of the first antenna element 10 (for example, on a front face 11*a* side of a first glass substrate 11). The first antenna element 10 and the second antenna element 20 are joined together through a joining material 30. As the joining material 30, for example, adhesive or a solder ball can be used. Further, also the antenna device 1 and the communication circuit board 5 are joined together through a joining material not depicted.

Figure 3A:
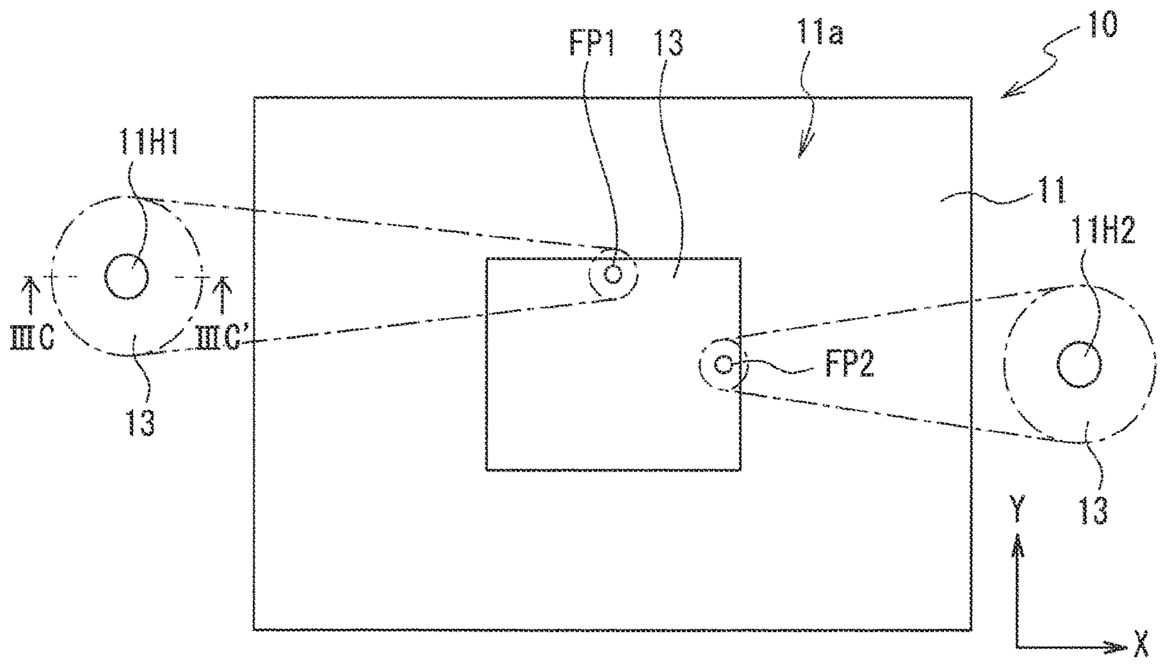
FIG. 3A is a top plan view depicting an example of a configuration of a first antenna element according to an embodiment of the present disclosure.
Figure 3B:
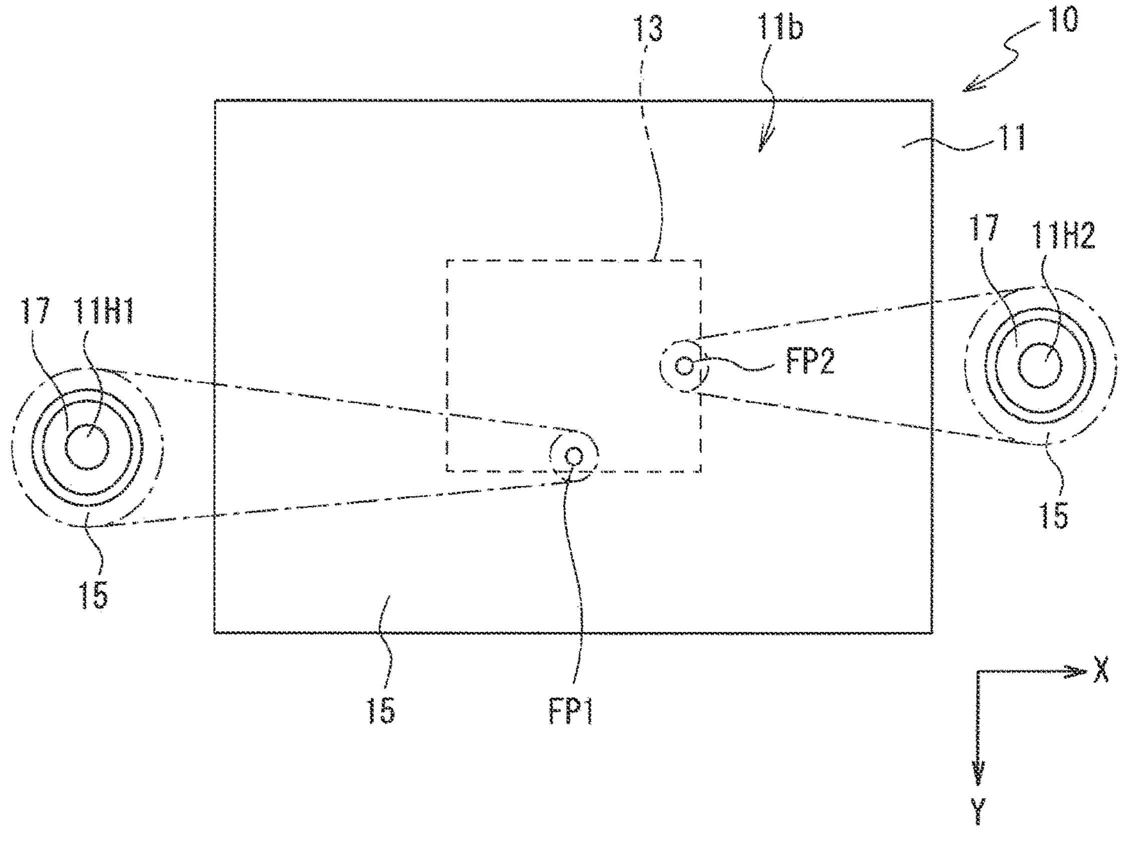
FIG. 3B is a bottom plan view depicting an example of a configuration of the first antenna element according to the embodiment of the present disclosure.
Figure 3C:
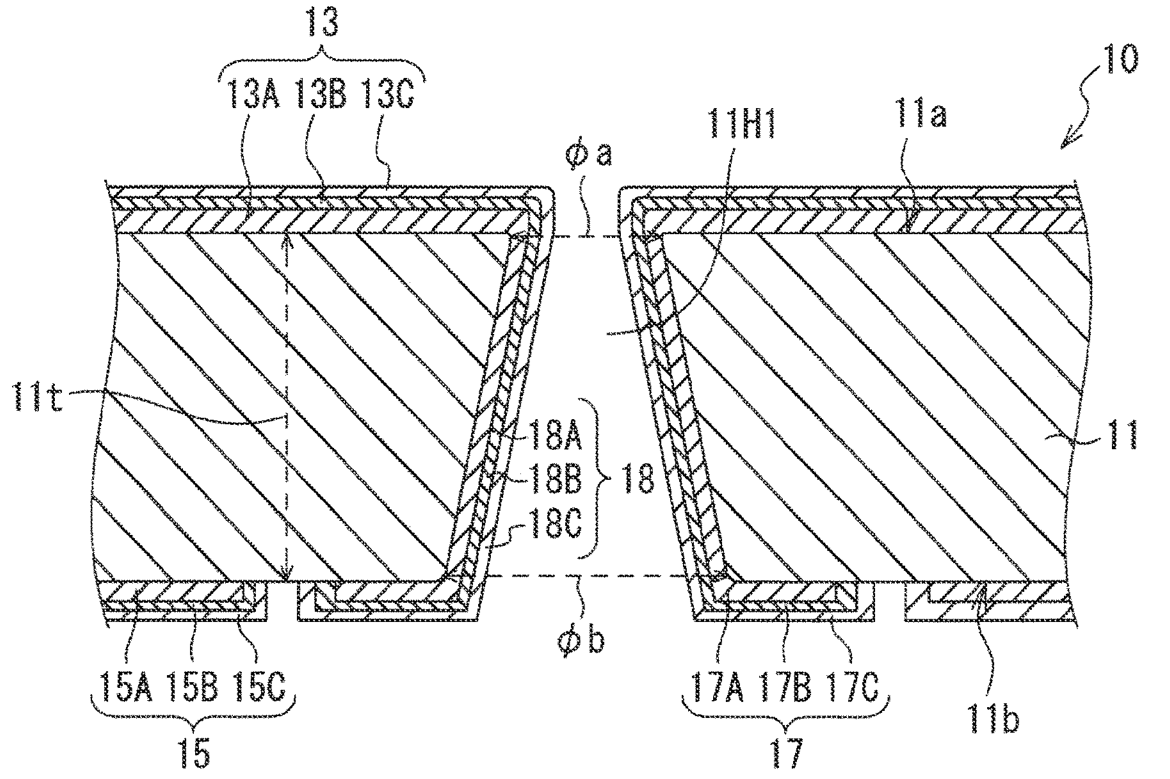
FIG. 3C is an enlarged cross sectional view depicting an example of a configuration of the first antenna element according to the embodiment of the present disclosure.

FIG. 3A is a top plan view depicting an example of a configuration of the first antenna element according to an embodiment of the present disclosure. FIG. 3B is a bottom plan view depicting an example of the configuration of the first antenna element according to the embodiment of the present disclosure. FIG. 3C is an enlarged cross sectional view depicting an example of the configuration of the first antenna element according to the embodiment of the present disclosure. FIG. 3C depicts a cross section taken along line IIIC-IIIC' in the enlarged view of FIG. 3A. As depicted in FIGS. 2, 3A, 3B, and 3C, the first antenna element 10 includes the first glass substrate 11, a first patch antenna 13 provided on the front face 11*a* side of the first glass substrate 11, a conductor layer 15 provided on a rear face 11*b* side of the first glass substrate 11, and a terminal layer 17 provided on the rear face 11*b* side of the first glass substrate 11. As depicted in FIGS. 2, 3B, and 3C, the conductor layer 15 and the terminal layer 17 are provided on the side opposite to the first patch antenna 13 across the first glass substrate 11. The conductor layer 15 and the terminal layer 17 are spaced from each other and are not electrically connected to each other.

The first glass substrate 11 has a first through-hole 11H1 and a second through-hole 11H2 provided therethrough such that they extend between the front face 11*a* and the rear face 11*b*. The first through-hole 11H1 and the second through-hole 11H2 are spaced from each other. The first patch antenna 13 is arranged on one end side of the first through-hole 11H1, and the terminal layer 17 is arranged on the other end side of the first through-hole 11H1. Similarly, the first patch antenna 13 is arranged on one end side of the second through-hole 11H2, and the terminal layer 17 is arranged on the other end side of the second through-hole 11H2. The terminal layer 17 is provided one for each of the first through-hole 11H1 and the second through-hole 11H2.

The first through-hole 11H1 and the second through-hole 11H2 have shapes same as each other and have sizes same as each other. The shape as viewed in top plan of each of the first through-hole 11H1 and the second through-hole 11H2 (the shape is hereinafter referred to as a planar shape) is, for example, a circular shape. Where the diameter of the first through-hole 11H1 and the second through-hole 11H2 on the front face 11*a* side is represented by ϕa and the diameter of them on the rear face 11*b* side is represented by ϕb, the diameter ϕa is smaller than the diameter ϕb. As an example, ϕa is 0.1 mm and ϕb is 0.125 mm. By forming the first through-hole 11H1 and the second through-hole 11H2 from the rear face 11*b* side of the first glass substrate 11, ϕa<ϕb can be implemented.

It is to be noted that the shape of the first through-hole 11H1 and the second through-hole 11H2 is not limited to that described above. For example, in the first through-hole 11H1 and the second through-hole 11H2, the diameter ϕa on the front face 11*a* side may be greater than the diameter ϕb on the rear face 11*b* side. By forming the first through-hole 11H1 and the second through-hole 11H2 from the front face 11*a* side of the first glass substrate 11, ϕa>ϕb can be implemented.

As depicted in FIG. 3C, a connection layer 18 is provided on an inner side face of the first through-hole 11H1. The first patch antenna 13 and the terminal layer 17 are electrically connected to each other through the connection layer 18 provided on the inner side face of the first through-hole 11H1. Similarly, the connection layer 18 is provided also on an inner side face of the second through-hole 11H2. The first patch antenna 13 and the terminal layer 17 are electrically connected to each other through the connection layer 18 provided on the inner side face of the second through-hole 11H2.

The first patch antenna 13, the conductor layer 15, the terminal layer 17, and the connection layer 18 each include a conductor such as copper (Cu) or Cu alloy containing Cu as a main component. Alternatively, the first patch antenna 13, the conductor layer 15, the terminal layer 17, and the connection layer 18 may each include a stacked film on which plural types of conductors are stacked. For example, as depicted in FIG. 3C, the first patch antenna 13 includes a Cu layer 13A formed by electrolytic plating, a nickel (Ni) layer 13B formed by electroless plating and a gold (Au) layer 13C formed by electroless plating. The Cu layer 13A, the Ni layer 13B, and the Au layer 13C are stacked in this order from the first glass substrate 11 side.

Similarly, the conductor layer 15 includes a Cu layer 15A formed by electrolytic plating, an Ni layer 15B formed by electroless plating, and an Au layer 15C formed by electroless plating. The Cu layer 15A, the Ni layer 15B, and the Au layer 15C are stacked in this order from the first glass substrate 11 side.

The terminal layer 17 includes a Cu layer 17A formed by electrolytic plating, an Ni layer 17B formed by electroless plating, and an Au layer 17C formed by electroless plating. The Cu layer 17A, the Ni layer 17B, and the Au layer 17C are stacked in this order from the first glass substrate 11 side.

The connection layer 18 includes a Cu layer 18A formed by electrolytic plating, an Ni layer 18B formed by electroless plating, and an Au layer 18C formed by electroless plating. The Cu layer 18A, the Ni layer 18B, and the Au layer 18C are stacked in this order from the first glass substrate 11 side.

Exemplifying a thickness of each layer, the Cu layers 13A, 15A, 17A, and 18A each have a thickness of 5.0 μm and the Ni layers 13B, 15B, 17B, and 18B each have a thickness of 3.0 μm, and the Au layers 13C, 15C, 17C, and 18C each have a thickness of 0.3 μm.

A joining portion between the connection layer 18 provided on the first through-hole 11H1 and the first patch antenna 13 is a first feeding point FP1 of the first patch antenna 13. A joining portion between the connection layer 18 provided on the second through-hole 11H2 and the first patch antenna 13 is a second feeding point FP2 of the first patch antenna 13. The second feeding point FP2 is located at a position spaced away from the first feeding point FP1. The first feeding point FP1 and the second feeding point FP2 are connected to impedances having magnitudes equal to each other (for example, 50Ω). Consequently, the first feeding point FP1 and the second feeding point FP2 resonate with each other.

As depicted in FIG. 3A, the planar shape of the first glass substrate 11 is a rectangular shape. The planar shape of the first patch antenna 13 is also a rectangular shape. As depicted in FIG. 3B, the planar shape of the terminal layer 17 is a circular shape. The terminal layer 17 is provided in a region overlapping, as viewed in top plan, with the first patch antenna 13. The conductor layer 15 is provided in a region overlapping, as viewed in top plan, with the first patch antenna 13 except the terminal layer 17 and its surrounding region. It is to be noted that the conductor layer 15 may be provided on the overall rear face 11*b* of the first glass substrate 11.

The first glass substrate 11 contains silicon (Si) and oxygen (O) as main constituent elements. Further, the first glass substrate 11 may contain some metal element in addition to Si and O. The first glass substrate 11 has transparency (for example, can transmit visible light therethrough) and is colorless and transparent or colored and transparent. It is to be noted that the transparency is not limited to the property of transmitting visible light and may be a property of transmitting infrared rays or ultraviolet rays.

The length of the first glass substrate 11 in the longitudinal direction (for example, in the Y-axis direction) is, for example, 5 mm or more but 25 mm or less. The length of the first glass substrate 11 in the lateral direction (for example, in the X-axis direction) is, for example, 5 mm or more but 25 mm or less. A thickness lit (refer to FIG. 3C) of the first glass substrate 11 is, for example, 0.3 mm or more but 1.0 or less. The lengths in the longitudinal direction and the lateral direction of the first patch antenna 13 depend upon the frequency, and the size of ½ of the wavelength is a rough standard.

Figure 4A:
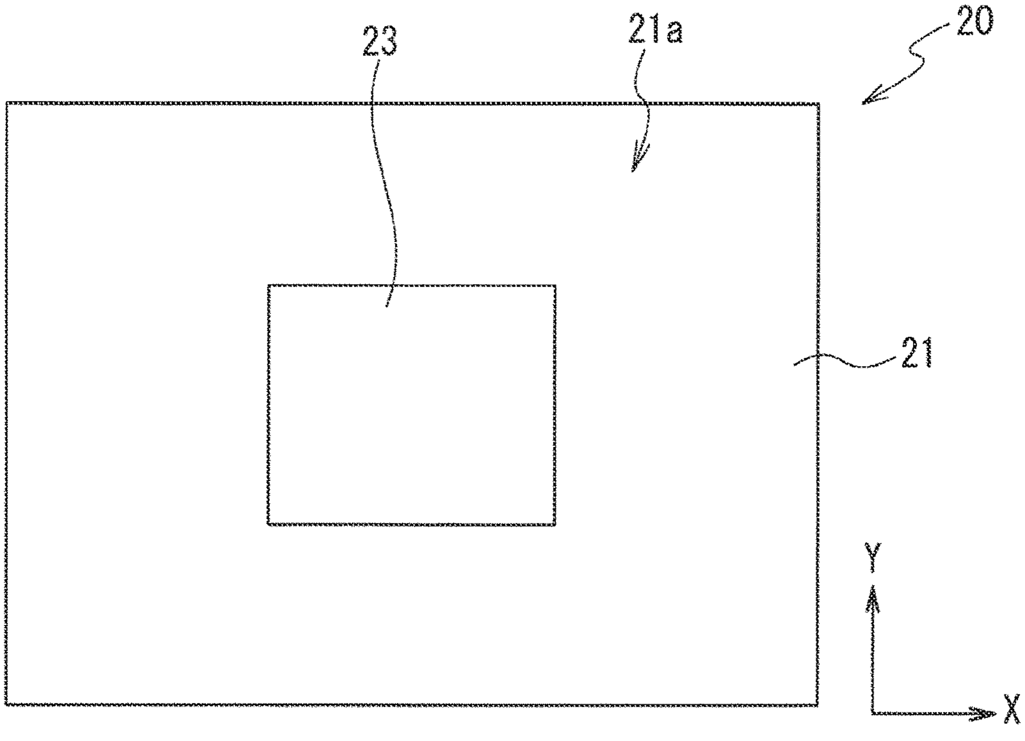
FIG. 4A is a top plan view depicting an example of a configuration of a second antenna element according to the embodiment of the present disclosure.
Figure 4B:
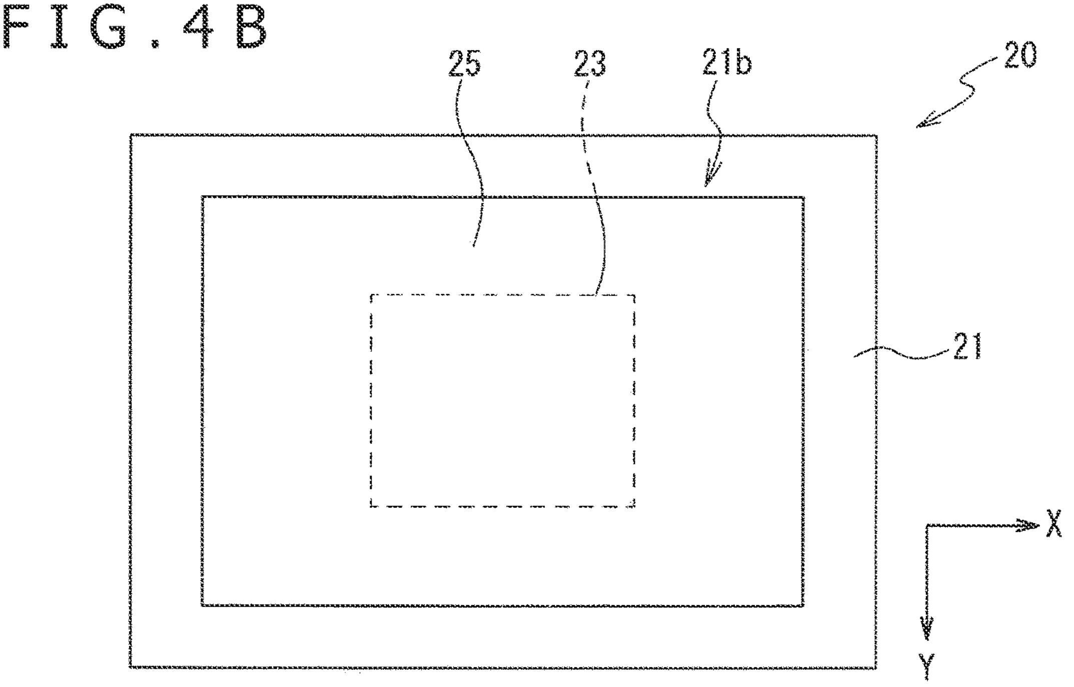
FIG. 4B is a top plan view depicting an example of a configuration of the second antenna element according to the embodiment of the present disclosure.

FIG. 4A is a top plan view depicting an example of a configuration of the second antenna element according to the embodiment of the present disclosure. FIG. 4B is a bottom plan view depicting an example of a configuration of the second antenna element according to the embodiment of the present disclosure. As depicted in FIGS. 2, 4A, and 4B, the second antenna element 20 includes a second glass substrate 21 and a second patch antenna 23 provided on a front face 21*a* side of the second glass substrate 21. A recessed portion 25 (an example of a second recessed portion as an air gap) is provided on a rear face 21*b* side of the second glass substrate 21. The recessed portion 25 is open to the face side that faces the first glass substrate 11. The second patch antenna 23 is located on the side opposite to a bottom face 25*a* of the recessed portion 25. The second patch antenna 23 includes, for example, a conductor such as Cu or Cu alloy.

As depicted in FIG. 4A, the planar shape of the second glass substrate 21 is a rectangular shape. The planar shape of the second patch antenna 23 is also a rectangular shape. As depicted in FIG. 4B, the planar shape of the recessed portion 25 is also a rectangular shape. The second glass substrate 21 contains silicon (Si) and oxygen (O) as main constituent elements. Further, the second glass substrate 21 may also contain some metal element in addition to Si and O. The second glass substrate 21 has transparency and is colorless and transparent or colored and transparent.

The length of the second glass substrate 21 in the longitudinal direction is, for example, 0.5 mm or more but 15 mm or less. The length of the second glass substrate 21 in the lateral direction is, for example, 0.5 mm or more but 15 mm or less. The thickness of the second glass substrate 21 is, for example, 0.3 mm or more but 1.0 mm or less.

Also the lengths of the second patch antenna 23 in the longitudinal direction and the lateral direction depend upon the frequency, and the sizes equal to ½ the wavelengths are rough standards.

The first glass substrate 11 and the second glass substrate 21 may have the same shape and the same size. In particular, the length in the longitudinal direction, the length in the lateral direction, and the thickness of the first glass substrate 11 may be the same as the length in the longitudinal direction, the length in the lateral direction, and the thickness of the second glass substrate 21, respectively. Also the first patch antenna 13 and the second patch antenna 23 may have the same shape and the same size.

The joining portion between the first through-hole 11H1 and the first patch antenna 13 is a first feeding point FP1 of the first patch antenna 13. The joining portion between the second through-hole 11H2 and the first patch antenna 13 is a second feeding point FP2 of the first patch antenna 13. The first patch antenna 13 is connected to a signal line for supplying a high frequency signal via at least one of the first feeding point FP1 and the second feeding point FP2. The second patch antenna 23 is not electrically connected to anything. The first patch antenna 13 and the second patch antenna 23 are in a resonance state. Although it is possible to provide the signal line on the communication circuit board 5, it is possible to provide the signal line also on the first glass substrate 11.

When the first patch antenna 13 transmits or receives a radio wave, for example, in the millimeter wave region, the first patch antenna 13 and the second patch antenna 23 resonate with each other. The conductor layer 15 serves as the ground and functions as a reflection layer. Consequently, the antenna device 1 has directivity in the normal direction of the first patch antenna 13 (for example, in the Z-axis direction). The antenna device 1 can transmit a radio wave in the millimeter wave region in the normal direction of the first patch antenna 13 (for example, in the Z-axis direction) and receive a radio wave from the Z-axis direction.

The substrate that configures the first patch antenna 13 and the substrate that configures the second patch antenna are each made of glass. The permittivity of glass is lower than that of a semiconductor such as silicon. Further, the recessed portion 25 is located between the first patch antenna 13 and the second patch antenna 23, and an air layer exists in the inside of the recessed portion 25. The permittivity of the air layer is lower than the permittivity of glass. Since not a semiconductor but glass and an air layer exist between the first patch antenna 13 and the second patch antenna 23, the antenna device 1 can transmit or receive a radio wave in the millimeter wave region in a wide frequency band with high gain.

Figure 5A:
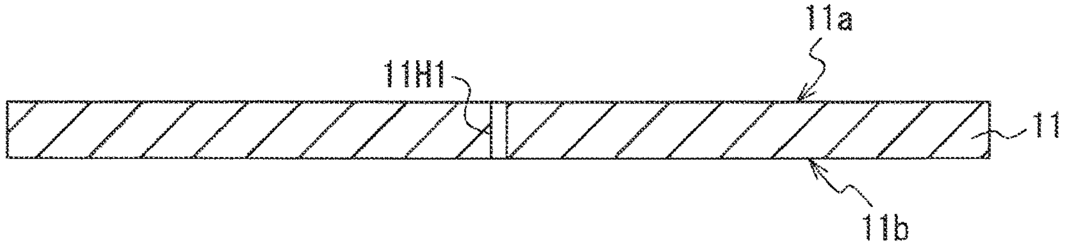
FIG. 5A is a cross sectional view depicting a manufacturing method of the first antenna element according to the embodiment 1 of the present disclosure in the order of steps.
Figure 5B:
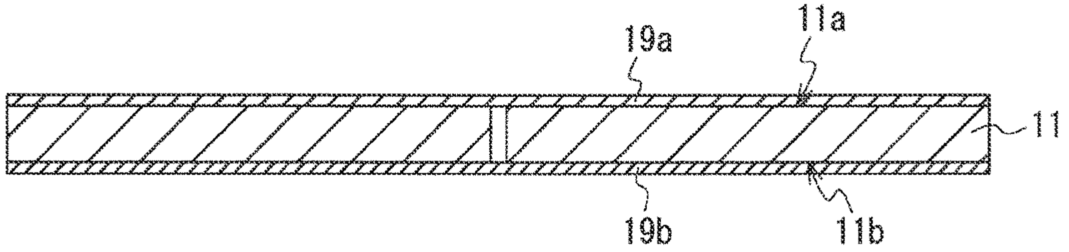
FIG. 5B is a cross sectional view depicting the manufacturing method of the first antenna element according to the embodiment 1 of the present disclosure in the order of steps.
Figure 5C:
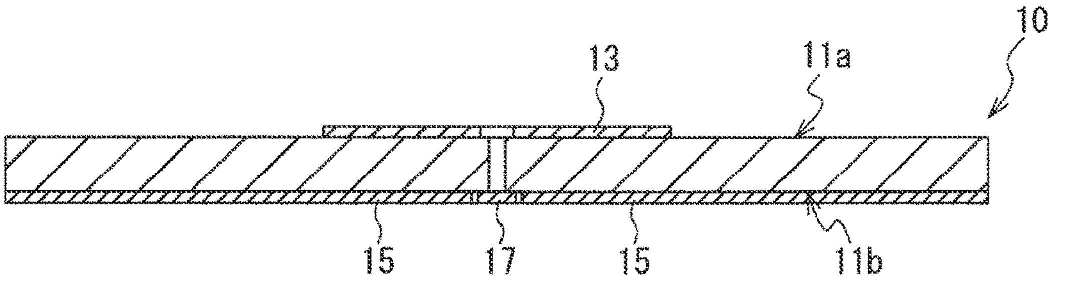
FIG. 5C is a cross sectional view depicting the manufacturing method of the first antenna element according to the embodiment 1 of the present disclosure in the order of steps.
Figure 6A:
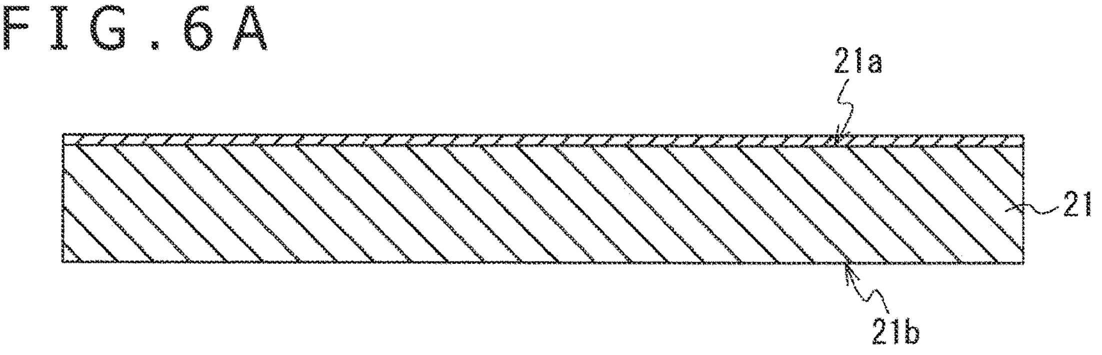
FIG. 6A is a cross sectional view depicting a manufacturing method of the second antenna element according to the embodiment 1 of the present disclosure in the order of steps.
Figure 6B:
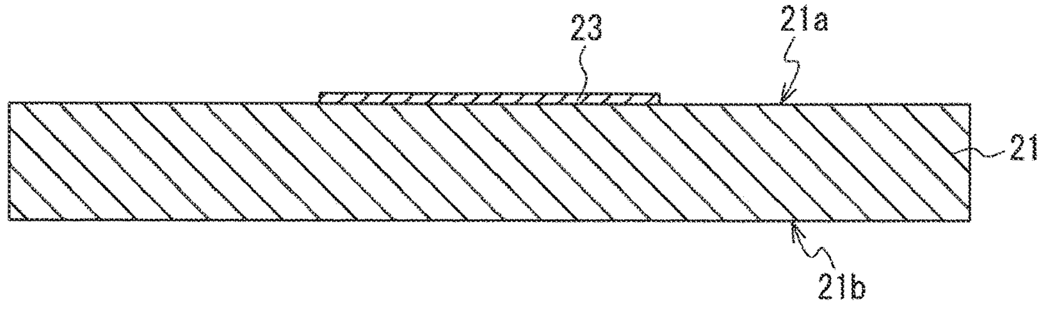
FIG. 6B is a cross sectional view depicting the manufacturing method of the second antenna element according to the embodiment 1 of the present disclosure in the order of steps.
Figure 6C:
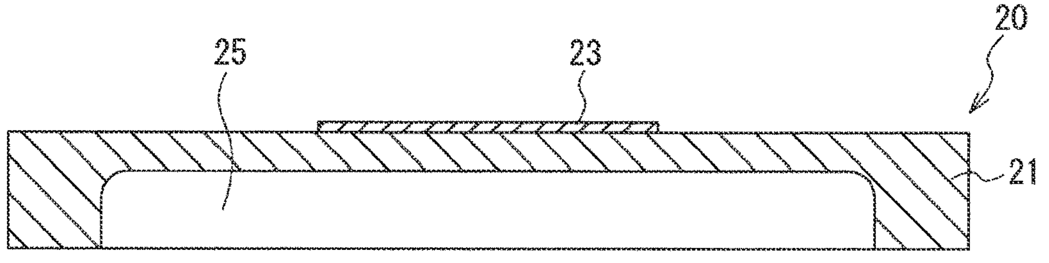
FIG. 6C is a cross sectional view depicting the manufacturing method of the second antenna element according to the embodiment 1 of the present disclosure in the order of steps.
Figure 7:
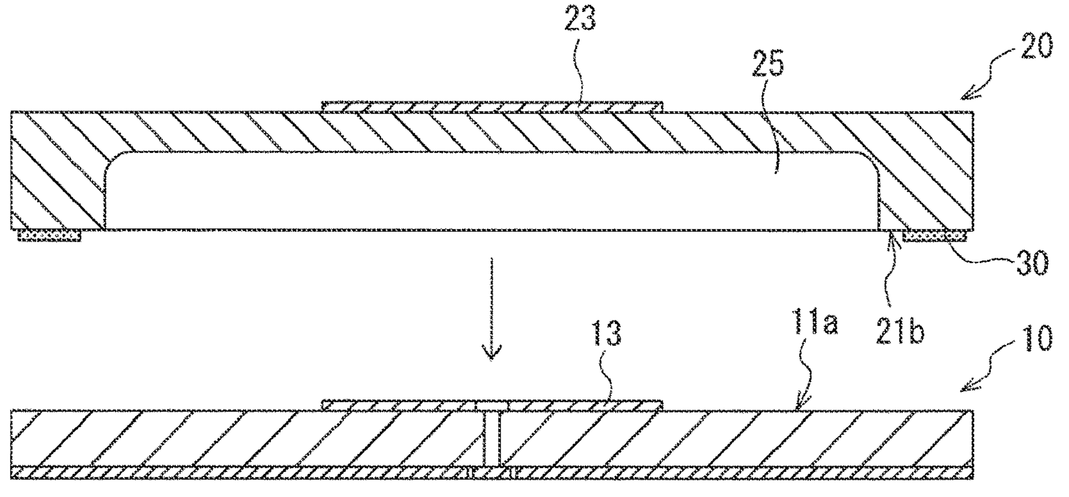
FIG. 7 is a cross sectional view depicting a step of attaching the second antenna element to the first antenna element.
Figure 8:
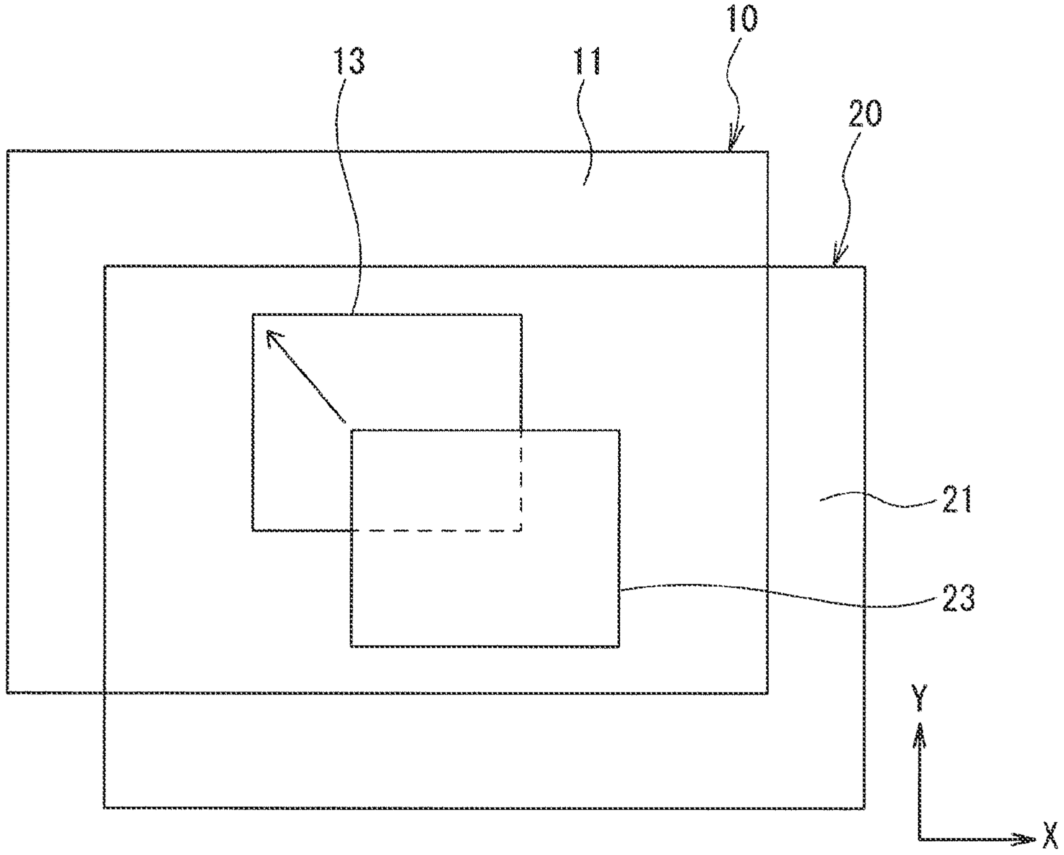
FIG. 8 is a top plan view depicting an example of a positioning method of the first antenna element and the second antenna element.

Now, a manufacturing method of the antenna device 1 is described. FIGS. 5A, 5B, and 5C are cross sectional views depicting a manufacturing method of the first antenna element according to the embodiment 1 of the present disclosure in the order of steps. FIGS. 6A, 6B, and 6C are cross sectional views of a manufacturing method of the second antenna element according to the embodiment 1 of the present disclosure in the order of steps. FIG. 7 is a cross sectional view depicting a step of attaching the second antenna element to the first antenna element. FIG. 8 is a top plan view depicting an example of a positioning method of the first antenna element and the second antenna element. It is to be noted that, for the manufacture of the antenna device 1, for example, used are various jigs or devices such as a laser, a drill, or an end mill for forming a through-hole in a glass substrate, an electrolytic plating or electroless plating apparatus for forming copper on the glass substrate, an apparatus for wet etching the copper, an apparatus for positioning the glass substrates relative to each other, and an apparatus for pasting the glass substrates together in the state in which they are positioned relative to each other. In the following description, the jigs or devices for manufacturing the antenna device 1 are collectively referred to as a manufacturing apparatus.

First, a manufacturing method of the first antenna element 10 is described. As depicted in FIG. 5A, the manufacturing apparatus forms a first through-hole 11H1 and a second through-hole 11H2 in a first glass substrate 11. Then, as depicted in FIG. 5B, the manufacturing apparatus, for example, forms copper 19*a* and copper 19*b* on a front face 11*a* and a rear face 11*b* of the first glass substrate 11, respectively, by electrolytic plating and forms copper also on the inner side face of the first through-hole 11H1 and the inner side face of the second through-hole 11H2 (for example, refer to FIGS. 3A and 3B). Next, the manufacturing apparatus patterns the copper 19*a* and copper 19*b* by photolithography and wet etching technologies. For the etching of the copper 19*a* and copper 19*b*, solution containing ferric chloride is used. Consequently, a first patch antenna 13 is formed from the copper on the front face 11*a* side as depicted in FIG. 5C. A conductor layer 15 and a terminal layer 17 are formed from the copper on the rear face 11*b* side. Each of the copper in the first through-hole 11H1 and the copper in the second through-hole 11H2 becomes a connection layer 18. The first antenna element 10 is completed through the steps described above.

It is to be noted that, as depicted in FIG. 3C, each of the first patch antenna 13, the conductor layer 15, the terminal layer 17, and the connection layer 18 may be a stacked layer containing Cu, Ni, and Au. In this case, the manufacturing apparatus may, for example, form a Cu layer by electrolytic plating and form an Ni layer and an Au layer by electroless plating.

Now, a manufacturing method of the second antenna element 20 is described. As depicted in FIG. 6A, the manufacturing apparatus forms copper 29 on a front face 21*a* of a second glass substrate 21, for example, by electrolytic plating. Next, the manufacturing apparatus patterns the copper 29 by photolithography and wet etching technologies. For the etching of the copper 29, solution containing ferric chloride is used. Consequently, a second patch antenna 23 is formed from the copper 29 as depicted in FIG. 6B. Then, the manufacturing apparatus etches a rear face 21*b* side of the second glass substrate 21 by photolithography and wet etching technologies. For the etching of the second glass substrate 21, solution containing hydrogen fluoride (HF) is used. Consequently, a recessed portion 25 is formed on the rear face 21*b* side of the second glass substrate 21 as depicted in FIG. 6C. The second antenna element 20 is completed through the steps described above.

It is to be noted that, since the recessed portion 25 is formed by isotropic etching, a boundary portion 25*c* between a bottom face 25*a* and an inner side face 25*b* of the recessed portion 25 is formed not in an angular shape but in a rounded shape.

Now, a method of attaching the second antenna element 20 to the first antenna element 10 is described. As depicted in FIG. 7, the manufacturing apparatus applies a joining material 30 to a peripheral edge portion located around the recessed portion 25 on the rear face 21*b* side of the second glass substrate 21 the second antenna element 20 has. Alternatively, the manufacturing apparatus applies the joining material 30 to a location that faces the peripheral edge portion described above, on the front face 11*a* side of the first glass substrate 11 the first antenna element 10 has. Then, the manufacturing apparatus positions the first glass substrate 11 and the second glass substrate 21 relative to each other such that the front face 11*a* side of the first glass substrate 11 and the rear face 21*b* side of the second glass substrate 21 face each other. Then, the manufacturing apparatus joins the first glass substrate 11 and the second glass substrate 21 together through the joining material 30. Consequently, the second antenna element 20 is attached to the first antenna element 10 to thereby complete the antenna device 1.

In the positioning step described above, the manufacturing apparatus uses the first patch antenna 13 provided on the first glass substrate 11 and the second patch antenna 23 provided on the second glass substrate 21 as marks for positioning. The first patch antenna 13 and the second patch antenna 23 are formed such that, if the first glass substrate 11 and the second glass substrate 21 are positioned relative to each other as designed, the first patch antenna 13 and the second patch antenna 23 overlap with each other in top plan.

For example, a case is supposed in which the first patch antenna 13 and the second patch antenna 23 have the same planar shape relative to each other and has the same size relative to each other. In this case, in the positioning step, the manufacturing apparatus moves the second glass substrate 21 relative to the first glass substrate 11 such that the first patch antenna 13 and the second patch antenna 23 overlap with each other as viewed in top plan and the contour of the first patch antenna 13 and the contour of the second patch antenna 23 coincide with each other, as depicted in FIG. 8. This makes it possible for the manufacturing apparatus to position the first glass substrate 11 and the second glass substrate 21 relative to each other with high accuracy.

As another example, a case is supposed in which the first patch antenna 13 and the second patch antenna 23 have the same planar shape relative to each other and one of the first patch antenna 13 and the second patch antenna 23 is smaller than the other of them. In this case, the manufacturing apparatus moves the second glass substrate 21 relative to the first glass substrate 11 such that the center position of the first patch antenna 13 and the center position of the second patch antenna 23 overlap with each other as viewed in top plan and the sides of an outer periphery of the first patch antenna 13 become parallel to the sides of an outer periphery of the second patch antenna 23. This makes it possible for the manufacturing apparatus to position the first glass substrate 11 and the second glass substrate 21 relative to each other with high accuracy.

The apparatus for positioning the glass substrates relative to each other includes at least any one of a first image capturing device arranged on the front face 21*a* side of the second glass substrate 21 and a second image capturing device arranged on the rear face 11*b* side of the first glass substrate 11. The second glass substrate 21 has transparency. Thus, the first image capturing device arranged on the front face 21*a* side of the second glass substrate 21 can capture an image of the second patch antenna 23 and can capture an image of the first patch antenna 13 through the second glass substrate 21. Further, not only the second glass substrate 21 but also the first glass substrate 11 has transparency. Thus, the second image capturing device arranged on the rear face 11*b* side of the first glass substrate 11 can capture an image of the first patch antenna 13 through the first glass substrate 11 and can capture an image of the second patch antenna 23 through the first glass substrate 11 and the second glass substrate 21. From such captured image data, the apparatus for positioning the glass substrates relative to each other can detect the position of each of the first patch antenna 13 and the second patch antenna 23.

Figure 9:
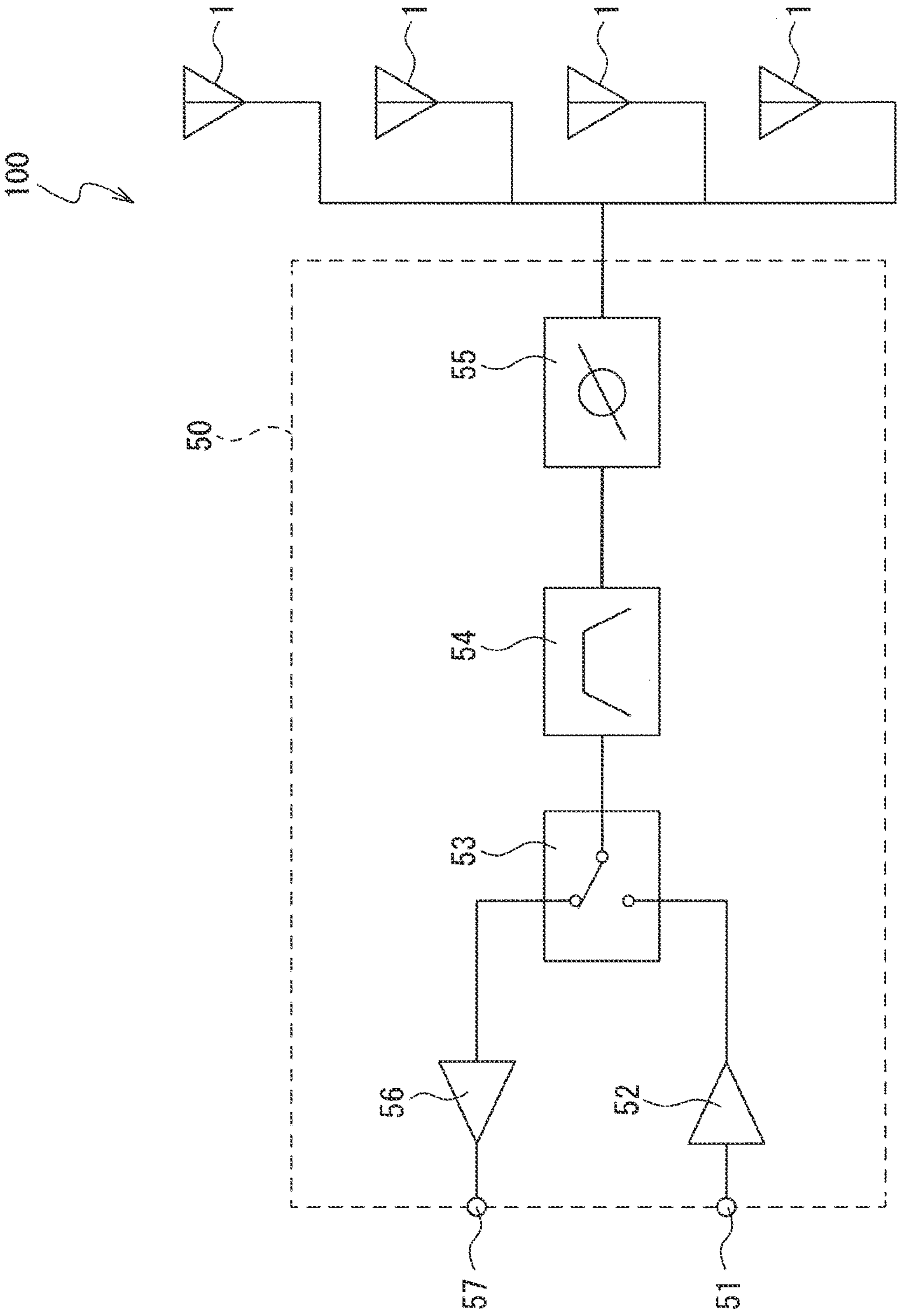
FIG. 9 is a block diagram depicting an example of a configuration of a wireless communication circuit according to the embodiment 1 of the present disclosure.

Now, an example of a configuration of the wireless communication circuit provided on the communication circuit board 5 is described. FIG. 9 is a block diagram depicting an example of a configuration of the wireless communication circuit according to the embodiment 1 of the present disclosure. FIG. 9 exemplifies a case in which plural antenna devices 1 are connected to a single wireless communication circuit 50. The plural antenna devices 1 may have covering frequency bands different from each other or may have covering frequency bands that partly overlap with each other.

As depicted in FIG. 9, the wireless communication circuit 50 according to the embodiment 1 includes an input terminal 51, a transmission amplifier 52, a switch 53, a filter 54, a phase shifter 55, a reception amplifier 56, and an output terminal 57. To the input terminal 51, a high frequency signal (for example, a signal of a millimeter wave) is inputted. The transmission amplifier 52 has a function of amplifying the high frequency signal inputted to the input terminal 51. The switch 53 has a function of switching the connection destination of the filter 54 from one to the other of the transmission amplifier 52 and the reception amplifier 56. The filter 54 has a function of removing unnecessary high frequency components from the high frequency signal. The phase shifter 55 is connected to the terminal layer 17 of the plural antenna devices 1 through signal lines provided on the communication circuit board 5. The reception amplifier 56 has a function of amplifying a reception signal received by the antenna device 1. The amplified reception signal is outputted from the output terminal 57. It is to be noted that the plural antenna devices 1 depicted in FIG. 9 have radio wave frequency bands or resonance points that may be different from each other or may be the same as each other.

As described above, the wireless communication apparatus 100 according to the embodiment 1 of the present disclosure includes an antenna device 1 and a wireless communication circuit 50 connected to the antenna device 1. The antenna device 1 includes a first antenna element 10 and a second antenna element 20 arranged on one face side of the first antenna element 10. The first antenna element 10 includes a first glass substrate 11 and a first patch antenna 13 provided on the first glass substrate 11. The second antenna element 20 includes a second glass substrate 21 and a second patch antenna 23 provided on the second glass substrate 21. At least part of the first patch antenna 13 faces the second patch antenna 23 with an air gap (for example, a recessed portion 25) interposed therebetween.

According to this configuration, a patch antenna of a cavity stack structure in which the first patch antenna 13 and the second patch antenna 23 are stacked with the air gap interposed therebetween is configured. The antenna device 1 can transmit or receive a radio wave in the millimeter wave region, by using the patch antenna of the cavity stack structure. Since the permittivity between the first patch antenna 13 and the second patch antenna 23 is suppressed low by the glass substrates and the air layer in the recessed portion 25, generation of a surface wave can be suppressed. The antenna device 1 can transmit or receive a radio wave in the millimeter wave region in a wide frequency band with high gain.

Further, since the first glass substrate 11 and the second glass substrate 21 are lower in permittivity than a semiconductor, the antenna device 1 can suppress dielectric loss by the first patch antenna 13 and the second patch antenna 23 low and can maintain high antenna efficiency.

A glass substrate can be panelized (upsized in area), and a greater number of first antenna elements 10 or second antenna elements 20 can be obtained from a single glass substrate than from a semiconductor substrate. This makes it possible to reduce the manufacturing cost of the antenna device 1.

The first glass substrate 11 and the second glass substrate 21 are small in dimensional change by heat in comparison with an organic substrate configured from an organic material and are stable in dimensional accuracy. The first glass substrate 11 and the second glass substrate 21 allow wet etching with solution containing hydrogen fluoride and are superior also in machining accuracy.

Generally, as the frequency band of a radio wave to be transmitted or received becomes higher, the antenna size decreases. If the size of the antenna fluctuates, then the frequency band of a radio wave that is transmitted or received fluctuates. Thus, high dimensional accuracy is demanded for an antenna for transmitting or receiving a wavelength especially in the millimeter wave region. Since the antenna device 1 is stable in dimensional accuracy and is superior also in machining accuracy as described above, it can suppress fluctuation of the frequency band, and improvement of an antenna characteristic can be anticipated.

A recessed portion 25 is provided on the second glass substrate 21. A frame structure is provided around the recessed portion 25. This frame structure increases the rigidity of the second glass substrate 21 and contributes to stabilization of the dimensional accuracy of the second glass substrate 21.

Further, both the first glass substrate 11 and the second glass substrate 21 have transparency. According to this, it is possible to capture an image of the first patch antenna 13 from the front face 21*a* side of the second glass substrate 21 through the second glass substrate 21 or to capture an image of the second patch antenna from the rear face 11*b* side of the first glass substrate 11 through the first glass substrate 11. Positioning of the first glass substrate and the second glass substrate is easy.

Embodiment 2

In the embodiment 1 described above, the recessed portion 25 is provided on the second glass substrate 21. However, the embodiment of the present disclosure is not limited to this. The air gap located between the first patch antenna 13 and the second patch antenna 23 may be provided not on the second glass substrate 21 but on the first glass substrate 11.

Figure 10:
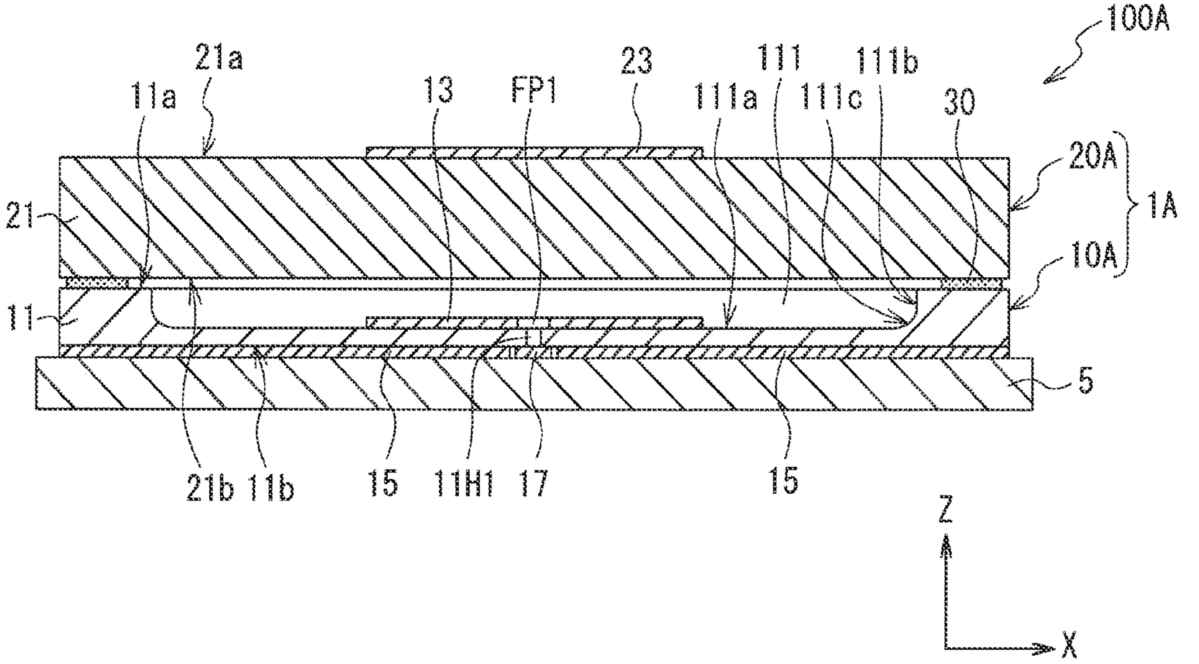
FIG. 10 is a perspective view depicting an example of a configuration of a wireless communication apparatus according to an embodiment 2 of the present disclosure.

FIG. 10 is a perspective view depicting an example of a configuration of a wireless communication apparatus according to an embodiment 2 of the present disclosure. As depicted in FIG. 10, a wireless communication apparatus 100A according to the embodiment 2 includes an antenna device 1A. The antenna device 1A includes a first antenna element 10A and a second antenna element 20A arranged on one face side of the first antenna element 10A.

The first antenna element 10A has a recessed portion 111 (an example of the first recessed portion as an air gap) provided on the front face 11*a* side of the first glass substrate 11. The planar shape of the recessed portion 111 is a rectangular shape. A first patch antenna 13 is provided on a bottom face 12*a* of the recessed portion 111. In the second antenna element 20A, a recessed portion 25 (refer to FIG. 2) may or may not be provided on the rear face 21*b* side of the second glass substrate 21. In FIG. 10, a case in which the recessed portion 25 is not provided on the second glass substrate 21 is exemplified. Since the recessed portion 111 is formed by isotropic etching, a boundary portion 111*c* between a bottom face 111*a* and an inner side face 111*b* of the recessed portion 111 is formed not in an angular shape but in a rounded shape.

Also in the antenna device 1A, an air gap (for example, the recessed portion 111) exists between the first patch antenna 13 and the second patch antenna 23. The permittivity between the first patch antenna 13 and the second patch antenna 23 is suppressed low by an air layer in the recessed portion 111.

Thus, the antenna device 1A can transmit or receive a radio wave in the millimeter wave region in a wide frequency band with high gain.

Embodiment 3

In the embodiment 1 described above, the first patch antenna 13 and the second patch antenna 23 are used as marks for positioning. However, the embodiment of the present disclosure is not limited to this. Any pattern may be used as a mark for positioning.

Figure 11:
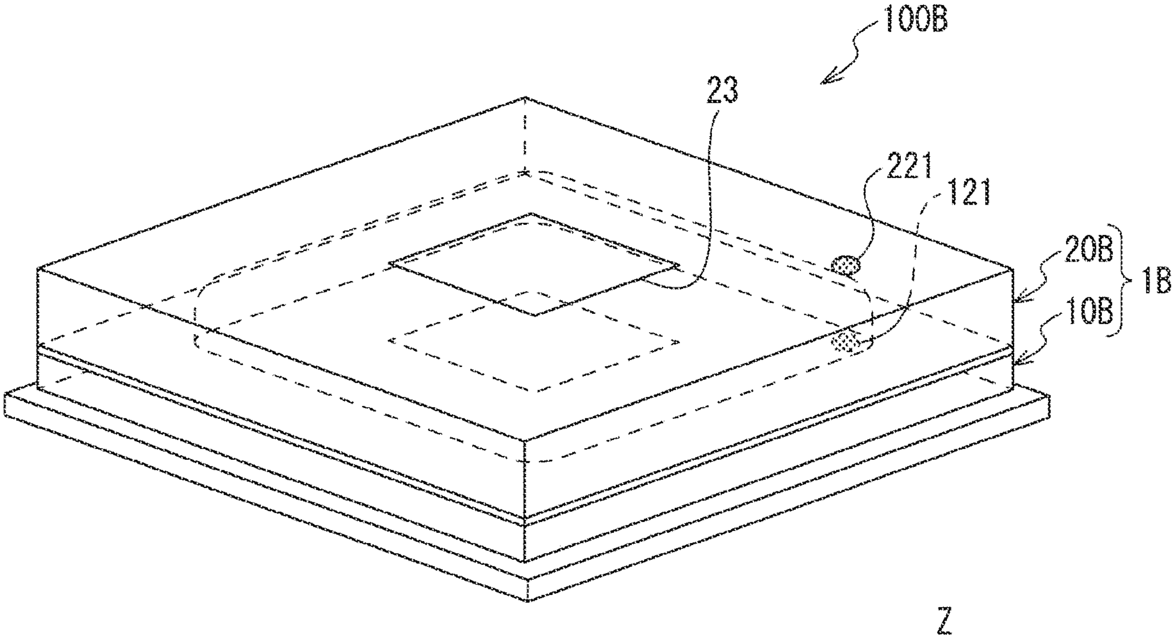
FIG. 11 is a perspective view depicting an example of a configuration of a wireless communication apparatus according to an embodiment 3 of the present disclosure.

FIG. 11 is a perspective view depicting an example of a configuration of a wireless communication apparatus according to an embodiment 3 of the present disclosure. As depicted in FIG. 11, a wireless communication apparatus 100B according to the embodiment 3 includes an antenna device 1B. The antenna device 1B includes a first antenna element 10B and a second antenna element 20B arranged on one face side of the first antenna element 10B.

The first antenna element 10B has a first positioning mark 121 provided on the front face 11*a* side or the rear face 11*b* side of the first glass substrate 11. In FIG. 11, a case in which the first positioning mark 121 is provided on the front face 11*a* side of the first glass substrate 11 is exemplified. For example, the first positioning mark 121 is formed simultaneously at the same step as that for the first patch antenna 13, for example. Consequently, the first positioning mark 121 is configured from a material same as that of the first patch antenna 13 (as an example, from Cu or Cu alloy) and has the same film thickness. The first positioning mark 121 may have any planar shape such as a perfect circle, an ellipsis, a rectangle, or a cross shape.

The second antenna element 20B has a second positioning mark 221 provided on the front face 21*a* side or the rear face 21*b* side of the second glass substrate 21. In FIG. 11, a case in which the second positioning mark 221 is provided on the front face 21*a* side of the second glass substrate 21 is exemplified. For example, the second positioning mark 221 is formed simultaneously at the same step as that for the second patch antenna 23. Consequently, the second positioning mark 221 is configured from a material same as that of the second patch antenna 23 (as an example, from Cu or Cu alloy) and has the same film thickness. The second positioning mark 221 may have any planar shape such as a perfect circle, an ellipsis, a rectangle, or a cross shape.

The first positioning mark 121 and the second positioning mark 221 are formed such that, if the first glass substrate 11 and the second glass substrate 21 are positioned as designed, the first positioning mark 121 and the second positioning mark 221 overlap with each other as viewed in top plan. Also with such a configuration as just described, the manufacturing apparatus can position the first glass substrate 11 and the second glass substrate 21 relative to each other with high accuracy, by using the first positioning mark 121 and the second positioning mark 221.

It is to be noted that the manufacturing apparatus may position the first glass substrate 11 and the second glass substrate 21 relative to each other, by using both the first patch antenna 13 and second patch antenna 23 and the first positioning mark 121 and second positioning mark 221. According to this configuration, since the quantity of marks that are used for positioning increases, the accuracy in positioning is enhanced.

Alternatively, plural first positioning marks 121 and plural second positioning marks 221 may be provided. The manufacturing apparatus may position the first glass substrate 11 and the second glass substrate 21 relative to each other such that the plural first positioning marks 121 and the plural second positioning marks 221 overlap with each other as viewed in top plan. Also in this case, since the quantity of marks that are used for positioning increases, the accuracy in positioning is enhanced.

Embodiment 4

In the embodiments of the present disclosure, the antenna device 1 may include an end fire antenna in addition to the first patch antenna 13 and the second patch antenna 23.

Figure 12:
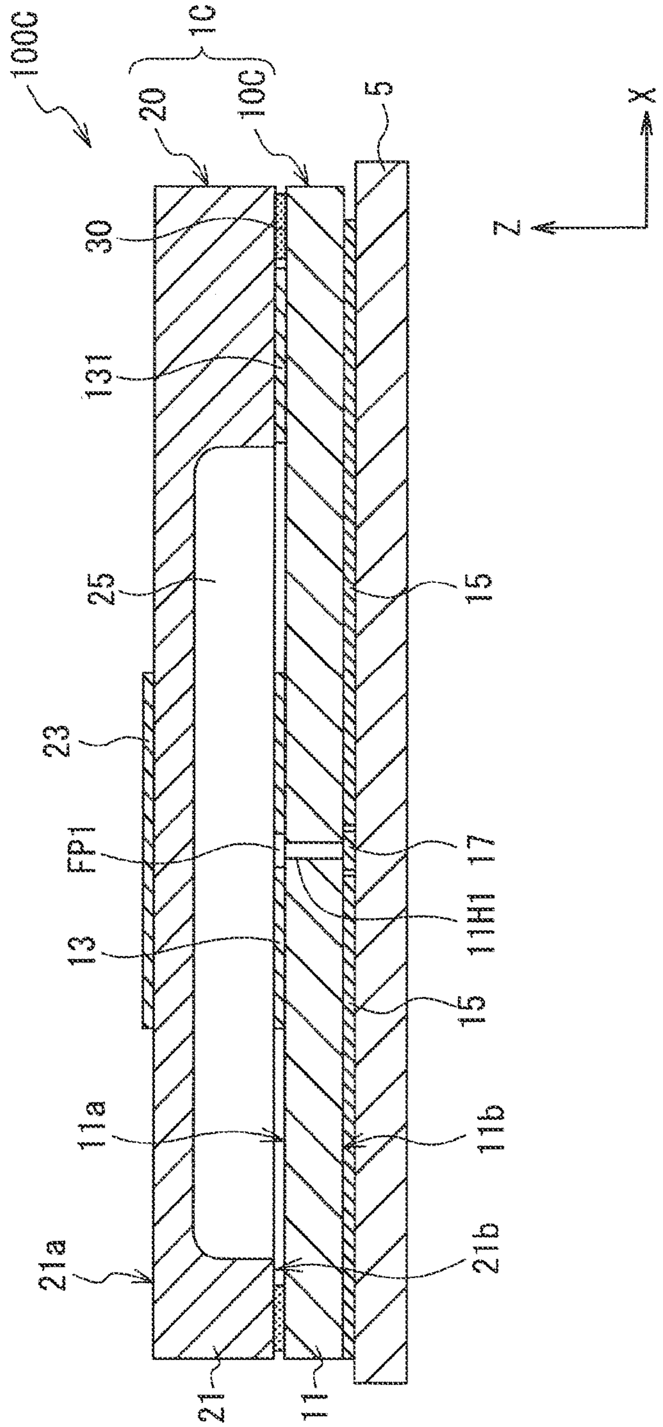
FIG. 12 is a perspective view depicting an example of a configuration of a wireless communication apparatus according to an embodiment 4 of the present disclosure.

FIG. 12 is a perspective view depicting an example of a configuration of a wireless communication apparatus according to an embodiment 4 of the present disclosure. As depicted in FIG. 12, a wireless communication apparatus 100C according to the embodiment 4 includes an antenna device 1C. The antenna device 1C includes a first antenna element 10C and a second antenna element 20 arranged on one face side of the first antenna element 10C.

The first antenna element 10C includes an end fire antenna 131 provided on the rear face 11*b* side of the first glass substrate 11. The planar shape of the end fire antenna 131 is a rectangle elongated in one direction (for example, in the Y-axis direction). The end fire antenna 131 is formed simultaneously in a step same as that for the conductor layer 15 and the terminal layer 17. Consequently, the end fire antenna 131 is configured from a material same as that of the conductor layer 15 and the terminal layer 17 (as an example, Cu or Cu alloy).

The end fire antenna 131 is connected to a signal line for supplying a high frequency signal. The end fire antenna 131 is not electrically connected to any of the conductor layer 15 and the terminal layer 17. The end fire antenna 131 has directivity in a horizontal direction parallel to the first patch antenna 13, which is a direction (for example, the X-axis direction) perpendicular to the one direction described hereinabove. Consequently, the antenna device 1C can transmit a radio wave in the millimeter wave region in the X-axis direction and can receive a radio wave in the millimeter wave region from the X-axis direction, via the end fire antenna 131. Since the antenna device 1C has directivity not only in the normal direction of the first patch antenna 13 but also in the horizontal direction of the first patch antenna 13, it can cover a wider area.

It is to be noted that FIG. 12 depicts a case in which one end fire antenna 131 is provided for one first patch antenna 13. However, this is an example to the last. The first antenna element 10C may otherwise include plural end fire antennas 131 for one first patch antenna 13. In this case, the plural end fire antennas 131 may have a directivity in the same direction or in a different direction. For example, from among the plural end fire antennas 131, a first end fire antenna may have a directivity in the X-axis direction while a second end fire antenna has a directivity in the Y-axis direction. By this, the antenna device 1C can cover a further wider area.

Embodiment 5

In the embodiment 1 described hereinabove, the bottom face of the recessed portion of the second glass substrate 21 is flat. However, the embodiment of the present disclosure is not limited to this. The bottom face 25*a* of the recessed portion 25 of the second glass substrate 21 may have recesses and/or protrusions provided thereon.

Figure 13:
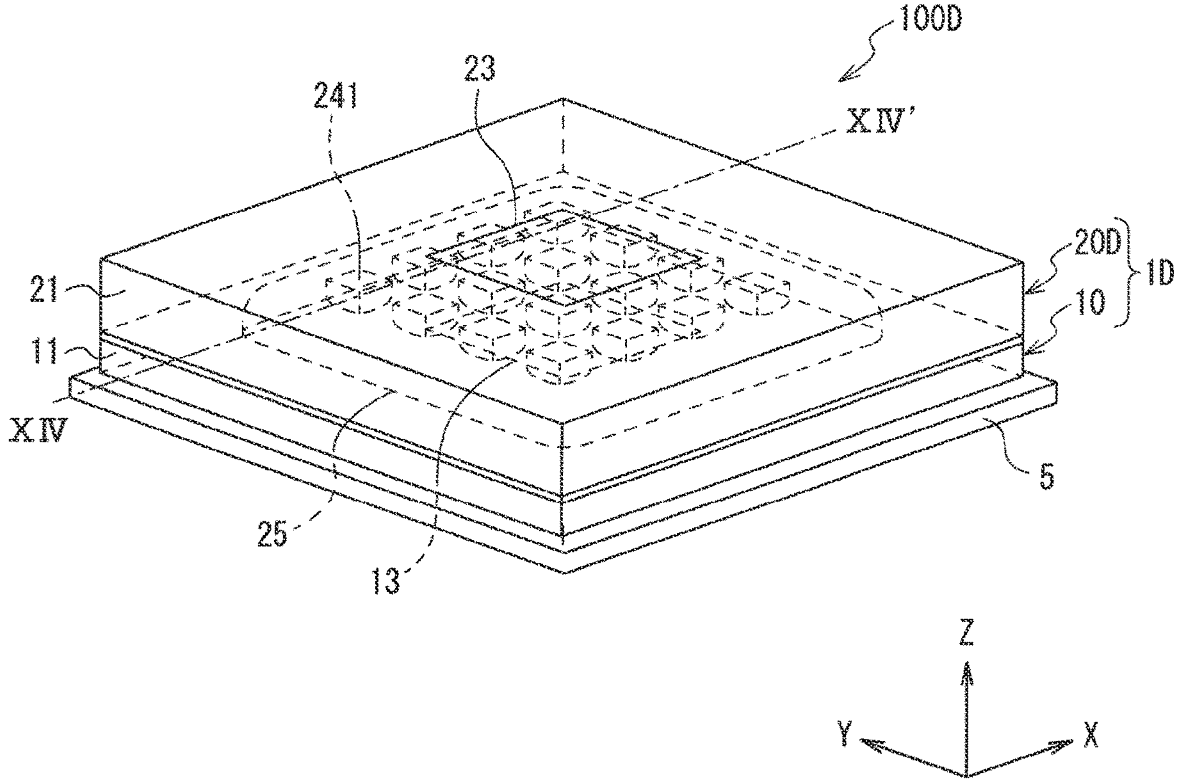
FIG. 13 is a perspective view depicting an example of a configuration of a wireless communication apparatus according to an embodiment 5 of the present disclosure.
Figure 14:
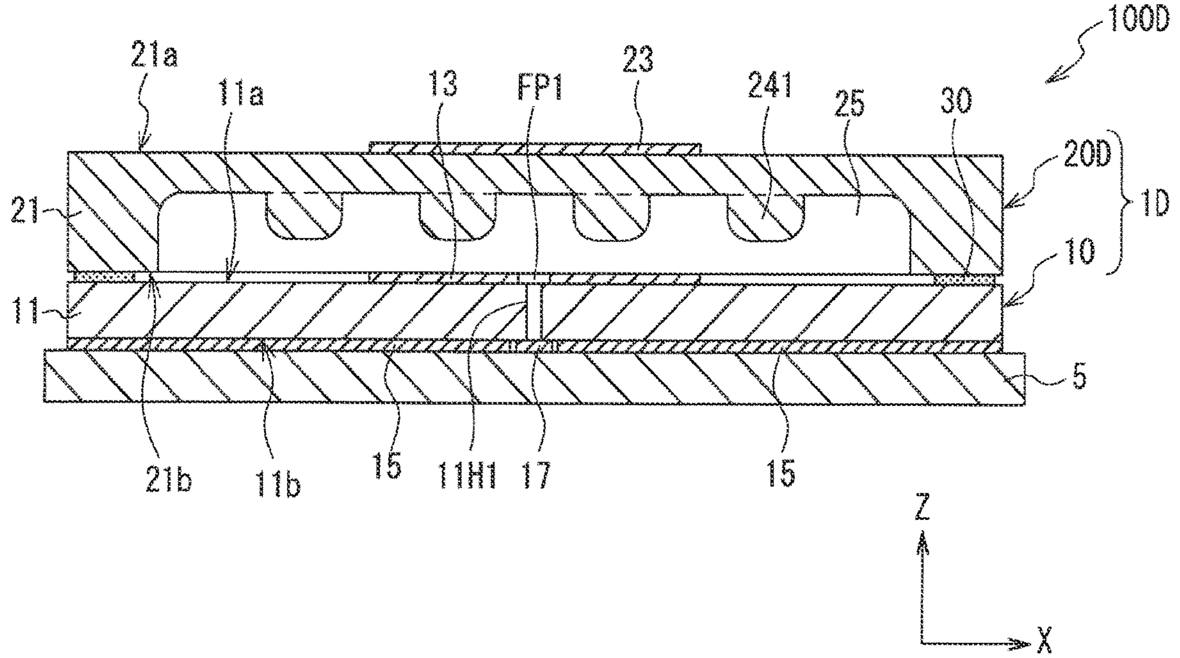
FIG. 14 is a perspective view depicting an example of a configuration of the wireless communication apparatus according to the embodiment 5 of the present disclosure.

FIG. 13 is a perspective view depicting an example of a configuration of a wireless communication apparatus according to an embodiment 5 of the present disclosure. FIG. 14 is a cross sectional view depicting an example of a configuration of a wireless communication apparatus according to the embodiment 5 of the present disclosure. FIG. 14 depicts a cross section taken along X-Z plane that passes line XIV-XIV' of FIG. 13. As depicted in FIGS. 13 and 14, a wireless communication apparatus 100D of the embodiment 5 includes an antenna device 1D. The antenna device 1D includes a first antenna element 10 and a second antenna element 20D arranged on one face side of the first antenna element 10.

In the second antenna element 20D, plural protrusions 241 are provided on a bottom face 25*a* of a recessed portion 25. The plural protrusions 241 have, for example, shapes and sizes same as each other. The plural protrusions 241 are arranged at equal distances in the X-axis direction and are also arranged at equal distances in the Y-axis direction. The arrangement distance in the X-axis direction and the arrangement distance in the Y-axis direction of the plural protrusions 241 may be the same as each other or may be different from each other. At least some of the plural protrusions 241 are located between the first patch antenna 13 and the second patch antenna 23.

The plural protrusions 241 may be provided integrally on the second glass substrate 21. In a case where the plural protrusions 241 are provided integrally on the second glass substrate 21, they are formed by etching the bottom face 25*a* of the recessed portion 25 with use of photolithography and wet etching technologies. Since the bottom face 25*a* of the recessed portion 25 is glass, solution containing hydrogen fluoride is used for the wet etching.

Where the plural protrusions 241 exist at equal distances in the X-axis direction and the Y-axis direction, the permittivity between the first patch antenna 13 and the second patch antenna 23 cyclically changes along the X-axis direction and the Y-axis direction. Consequently, the frequency band and the resonance point of the antenna device 1D shift from the frequency band and the resonance point that are those in a case where recesses or protrusions are not provided on the bottom face 25*a* of the recessed portion 25.

The plural protrusions 241 shift the frequency band and the resonance point of the antenna device 1D. The shift amount of the frequency band and the resonance point of the antenna device 1D has a value that differs depending upon the shape, size, arrangement, and so forth of the plural protrusions 241. By optionally designing the shape, size, arrangement, and so forth of the plural protrusions 241, the frequency band and the resonance point of the antenna device 1D can be adjusted. It is to be noted that, in the embodiment 5, the plural protrusions 241 may have shapes different from each other or may have sizes different from each other. Also in such configurations as just described, adjustment of the frequency band and the resonance point is possible.

Embodiment 6

In the embodiment 1 described above, one recessed portion 25 is described to be provided on the second glass substrate 21. However, in the present disclosure, the number of such recessed portions 25 provided on the second glass substrate 21 is not limited to one and may be a plural number.

Figure 15:
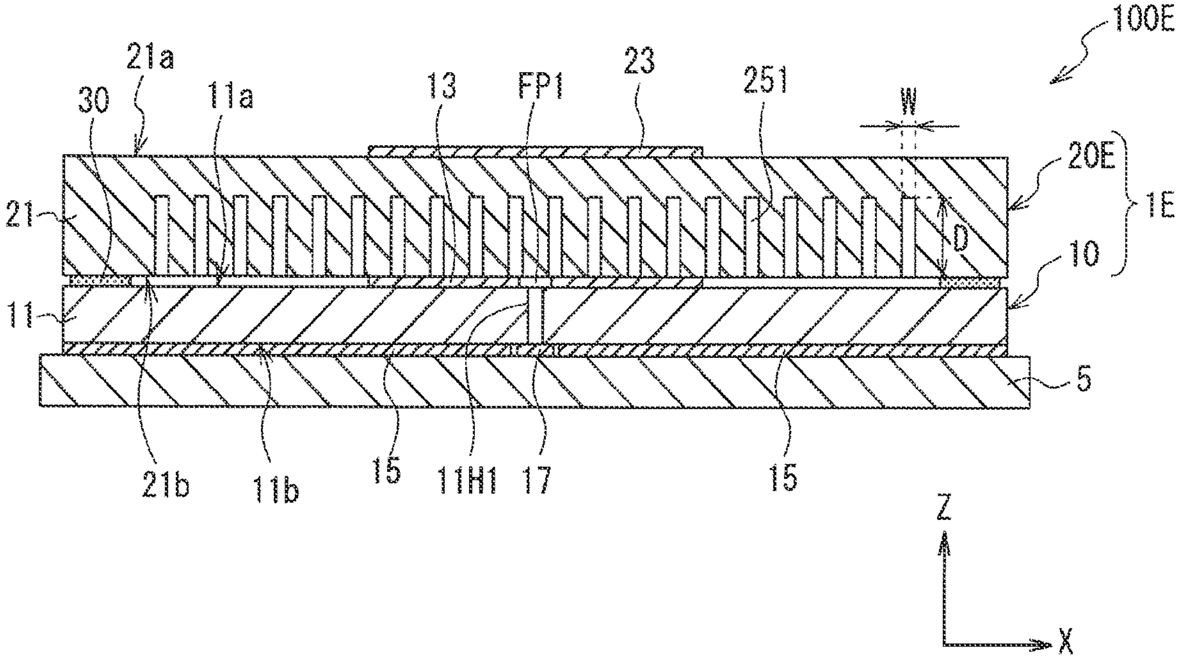
FIG. 15 is a perspective view depicting an example of a configuration of a wireless communication apparatus according to an embodiment 6 of the present disclosure.

FIG. 15 is a perspective view depicting an example of a configuration of a wireless communication apparatus according to an embodiment 6 of the present disclosure. As depicted in FIG. 15, a wireless communication apparatus 100E according to the embodiment 6 includes an antenna device 1E. The antenna device 1E includes a first antenna element 10 and a second antenna element 20E arranged on one face side of the first antenna element 10. In the second antenna element 20E, plural slits 251 (an example of a second recessed portion as an air gap) are provided on the rear face 21*b* side of the second glass substrate 21. The slits 251 are formed long in the Y-axis direction. The second patch antenna 23 is located such that it overlaps with at least some of the plural slits 251 as viewed in top plan.

The plural slits 251 are formed by etching the bottom face 25*a* of the recessed portion 25 with use of photolithography and wet etching technologies. Preferably, each of the plural slits 251 has an aspect ratio and an aspect ratio equal to or higher than 3 but equal to or lower than 8. The aspect ratio is a ratio of the dimension D of the slit in the depthwise direction (for example, in the Z-axis direction) to the dimension W in the widthwise direction (for example, the X-axis direction) of the slit and is indicated by D/W.

Also in the antenna device 1E, an air gap (for example, plural slits 251) exists between the first patch antenna 13 and the second patch antenna 23. The first patch antenna 13 faces the second patch antenna 23 through the plural slits 251. The permittivity between the first patch antenna 13 and the second patch antenna 23 is suppressed low by the air layer in the slits 251. Therefore, the antenna device 1E can transmit or receive a radio wave in the millimeter wave region in a wide frequency band with high gain.

Embodiment 7

In the foregoing description of the embodiment 1, it is described that the antenna device 1 includes one first patch antenna 13 and one second patch antenna 23. However, the embodiment of the present disclosure is not limited to this. The antenna device 1 may include plural first patch antennas 13 and plural second patch antennas 23.

Figure 16:
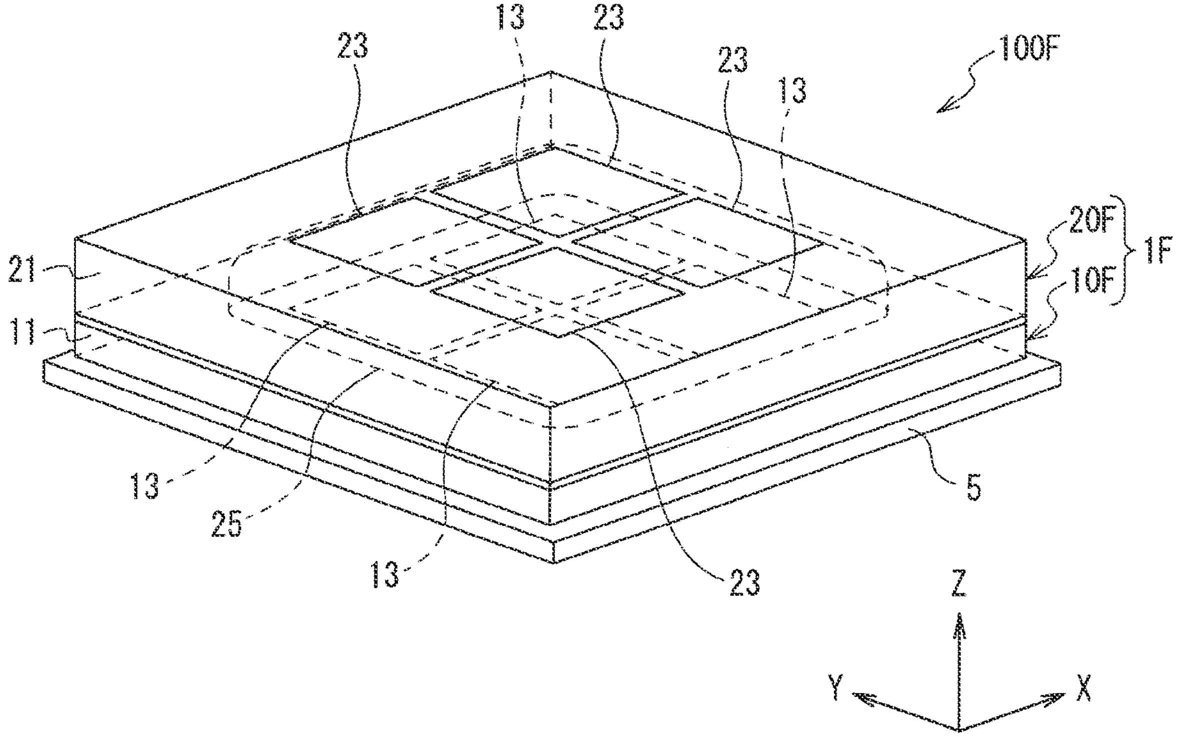
FIG. 16 is a perspective view depicting an example of a configuration of an antenna device according to an embodiment 7 of the present disclosure.

FIG. 16 is a perspective view depicting an example of a configuration of an antenna device according to an embodiment 7 of the present disclosure. As depicted in FIG. 16, a wireless communication apparatus 100F according to the embodiment 7 includes an antenna device 1F. The antenna device 1F includes a first antenna element 10F and a second antenna element 20F arranged on one face side of the first antenna element 10.

The first antenna element 10F includes plural first patch antennas 13 provided on the front face side of the first glass substrate 11. The second antenna element 20F includes plural second patch antennas 23 provided on the front face side of the second glass substrate 21. The plural first patch antennas 13 and the plural second patch antennas 23 each face each other. Further, one recessed portion 25 is provided on the second antenna element 20F. The plural first patch antennas 13 and the plural second patch antennas 23 are provided at positions overlapping with the recessed portion 25 as viewed in top plan.

Also in the antenna device 1F, an air gap (for example, the recessed portion 25) exists between the plural first patch antennas 13 and the plural second patch antennas 23. The permittivity between the plural first patch antennas 13 and the plural second patch antennas 23 is suppressed low by the air layer in the recessed portion 25. Therefore, the antenna device 1F can transmit or receive a radio wave in the millimeter wave region in a wide frequency band with high gain.

Since plural patch antennas of a cavity stack structure each including a first patch antenna 13 and a second patch antenna 23 are arranged, the antenna device 1F can transmit or receive a radio wave with high directivity. Simultaneously with this, since overlapping of radio waves is also enabled, the antenna gain can be increased.

Embodiment 8

In the embodiments of the present disclosure, the antenna device 1 may include a linear antenna (for example, a dipole antenna or a monopole antenna) in addition to the first patch antenna 13 and the second patch antenna 23.

Figure 17:
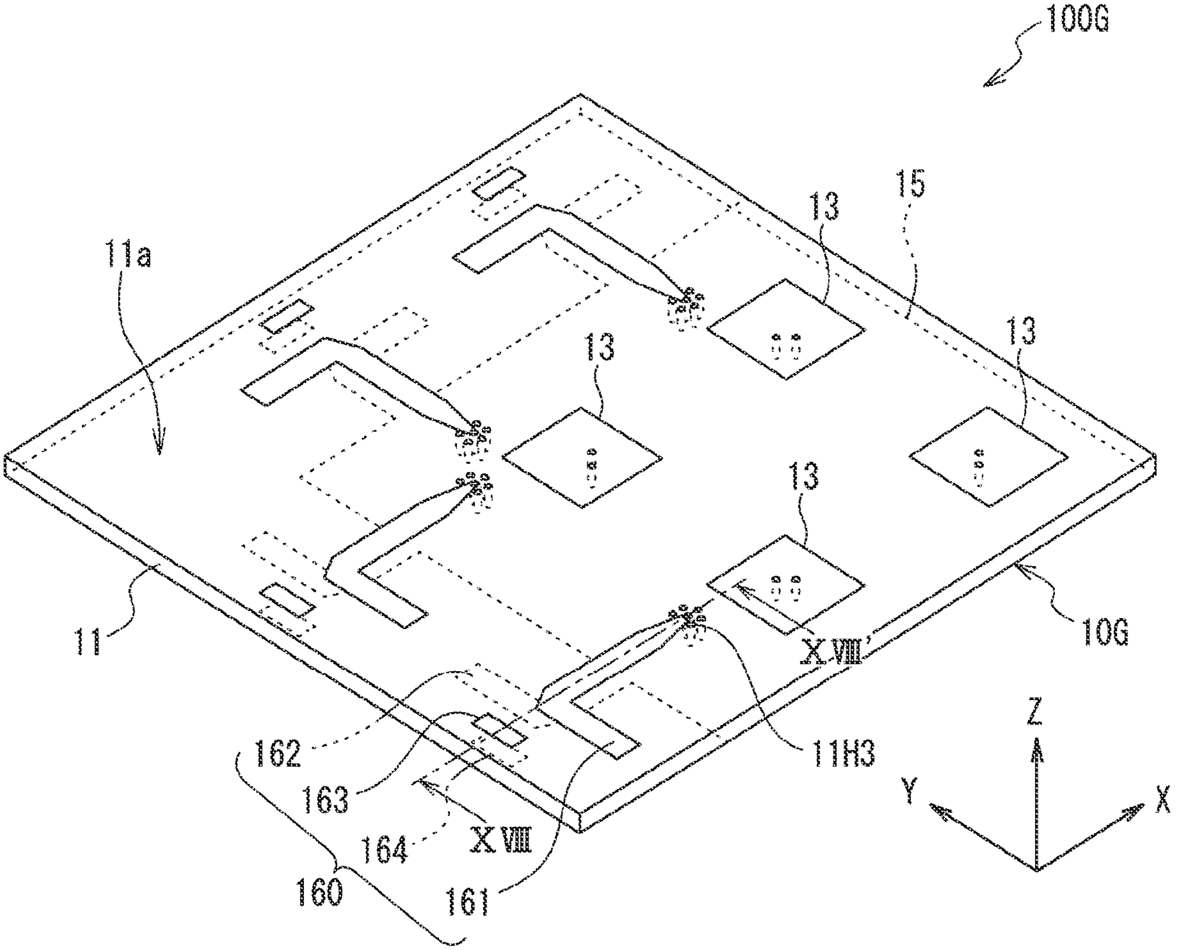
FIG. 17 is a perspective view depicting an example of a configuration of an antenna device according to an embodiment 8 of the present disclosure.
Figure 18:
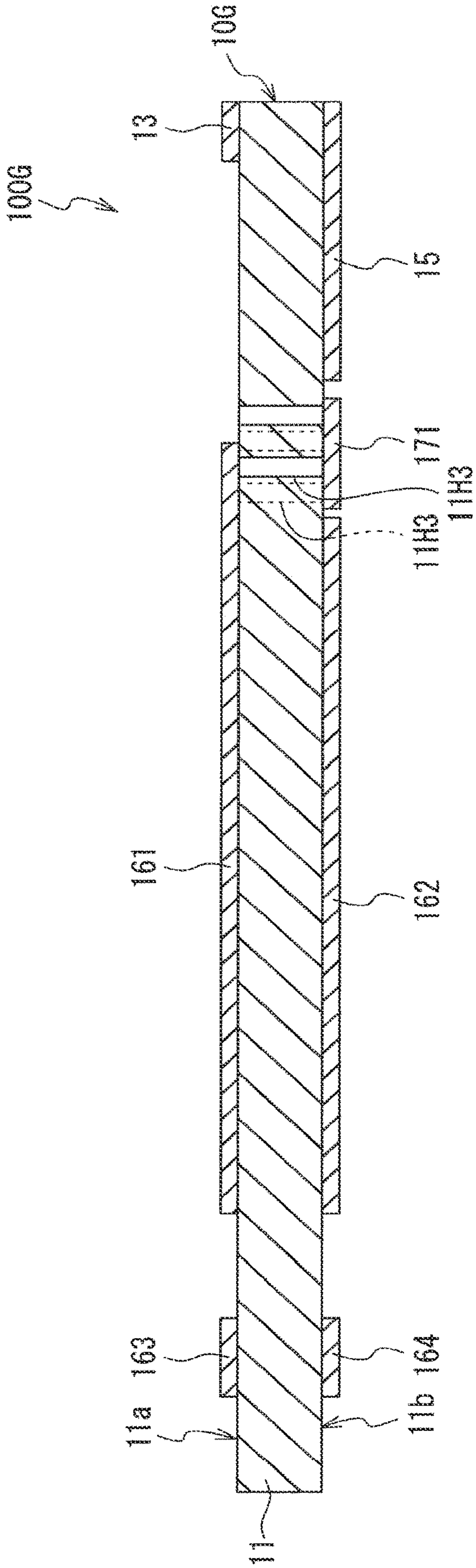
FIG. 18 is a cross sectional view depicting an example of a configuration of the antenna device according to the embodiment 8 of the present disclosure.

FIG. 17 is a perspective view depicting an example of a configuration of an antenna device according to an embodiment 8 of the present disclosure. FIG. 18 is a cross sectional view depicting an example of a configuration of the antenna device according to the embodiment 8 of the present disclosure. FIG. 17 depicts a cross section taken along an X-Z plane that passes line XVIII-XVIII' of FIG. 17. As depicted in FIGS. 17 and 18, an antenna device 1G according to the embodiment 7 includes a first antenna element 10G and a second antenna element 20 (refer to FIG. 1 or 2) arranged on one face side of the first antenna element 10G.

As depicted in FIGS. 17 and 18, the first antenna element 10G includes a first glass substrate 11, a first patch antenna 13 provided on the first glass substrate 11, and a dipole antenna 160 provided on the first glass substrate 11. The dipole antenna 160 includes a first conductor layer 161 and a third conductor layer 163 provided on the front face 11*a* side of the first glass substrate 11 and a second conductor layer 162 and a fourth conductor layer 164 provided on the rear face 11*b* side of the first glass substrate 11.

In the embodiment 7, the first glass substrate 11 has a third through-hole 11H3, which extends between the front face 11*a* and the rear face 11*b* through the first glass substrate 11, and a terminal layer 171 provided on the rear face 11*b*. As depicted in FIG. 18, the terminal layer 171 is not electrically connected to any of the conductor layer 15 and the second conductor layer 162 provided on the rear face 11*b* side.

In the first glass substrate 11, a first conductor layer 161 is provided on one end side of the third through-hole 11H3, and a terminal layer 171 is arranged on the other end side of the third through-hole 11H3. The first patch antenna 13 and the terminal layer 171 are electrically connected to each other through the third through-hole 11H3. It is to be noted that the third through-hole 11H3 may be filled up with a conductor. As an example of the conductor, Cu or Cu alloy is available.

The first conductor layer 161 and terminal layer 171 and the second conductor layer 162 are connected to the phase shifter 55 (refer to FIG. 9) of the wireless communication circuit 50 through signal lines provided, for example, on the communication circuit board 5. Otherwise, the second conductor layer 162 may be fixed to any potential (for example, the ground potential (0 V)) through a potential line provided on the communication circuit board 5. The third conductor layer 163 and the fourth conductor layer 164 are not electrically connected to anything.

The first conductor layer 161 and the third conductor layer 163 are formed simultaneously, for example, at a step same as that of the first patch antenna 13. Consequently, the first conductor layer 161 and the third conductor layer 163 are configured from a material same as that of the first patch antenna 13 (as an example, Cu or Cu alloy) and have the same film thickness.

Similarly, the second conductor layer 162, the fourth conductor layer 164, and the terminal layer 171 are formed simultaneously, for example, at a same step as that of the conductor layer 15 and the terminal layer 17. Consequently, the second conductor layer 162, the fourth conductor layer 164, and the terminal layer 171 are configured from a material same as that of the conductor layer 15 and the terminal layer 17 (as an example, Cu or Cu alloy) and have the same film thickness.

The dipole antenna 160 has directivity to a horizontal direction (for example, the X-axis direction or the Y-axis direction) parallel to the first patch antenna 13. Consequently, the antenna device 1G can transmit a radio wave in the millimeter wave region in a horizontal direction and receive a radio wave in the millimeter wave region from the horizontal direction through the dipole antenna 160. Since the antenna device 1G has directivity not only in a normal direction of the first patch antenna 13 but also in the horizontal direction of the first patch antenna 13, it can cover a further wider area.

Other Embodiments

Although the present disclosure has been described in connection with the embodiments and modifications in such a manner as described above, it shall not be understood that the discussion and the drawings that form part of the present disclosure restrict the present disclosure. From this disclosure, various alternative embodiments, working examples, and operational technologies will become apparent to those skilled in the art.

For example, in the embodiments of the present disclosure, mobile equipment, an automobile, and a building part may include one or more of the antenna devices 1 and 1A to 1G described above. In a case where mobile equipment includes one or more of the antenna devices 1 and 1A to 1G described above, part of a display panel of the mobile equipment may be the second glass substrate 21. This makes it possible to provide mobile equipment that transmits a radio wave in the millimeter region in a wide band or receives a radio rave in the millimeter region in a wide band.

In a case where an automobile includes one or more of the antenna devices 1 and 1A to 1G, part of the windshield or the rear windshield of the automobile may be the second glass substrate 21. This makes it possible to provide the automobile with a transmission function that transmits a radio wave in the millimeter wave region in a wide band or receives a radio wave in the millimeter wave region in a wide band.

In a case where a building part includes one or more of the antenna devices 1 and 1A to 1G, part of the building part may be the second glass substrate 21. As the building part, a glass window and so forth are available. This makes it possible to provide a building part that can transmit a radio wave in the millimeter wave region in a wide band or receive a radio wave in the millimeter wave region in a wide band.

In such a manner, it is a matter of course that the present technology includes various embodiments and so forth that are not described herein. It is possible to perform at least one of various omissions, replacements, and alterations of the components without departing from the subject matter of the embodiments and modifications described hereinabove. Further, the advantageous effects described in the present specification are illustrative to the last and are not restrictive, and other advantageous effects may be available.

It is to be noted that the present disclosure can also assume such configurations as described below.

(1)

An antenna device including:
- a first antenna element; and
- a second antenna element arranged on one face side of the first antenna element, in which
- the first antenna element includes
  - a first glass substrate, and
  - a first patch antenna provided on the first glass substrate,
- the second antenna element includes
  - a second glass substrate, and
  - a second patch antenna provided on the second glass substrate, and
- at least part of the first patch antenna faces the second patch antenna with an air gap interposed therebetween.

(2)

The antenna device according to (1) above, in which
- the first glass substrate and the second glass substrate each have transparency.

(3)

The antenna device according to (2) above, in which
- the first antenna element has a first positioning mark provided on the first glass substrate,
- the second antenna element has a second positioning mark provided on the second glass substrate, and
- the first positioning mark and the second positioning mark overlap with each other as viewed in top plan.

(4)

The antenna device according to any one of (1) to (3) above, in which
- the first antenna element has
  - a first feeding point connected to the first patch antenna, and
  - a second feeding point connected to the first patch antenna at a location spaced from the first feeding point.

(5)

The antenna device according to (4) above, in which
- the first feeding point and the second feeding point are connected to impedances having sizes equal to each other.

(6)

The antenna device according to any one of (1) to (5) above, in which the first glass substrate has a conductor layer that is provided on a side opposite to the first patch antenna across the first glass substrate and fixed to an optional potential.

(7)

The antenna device according to any one of (1) to (6) above, in which the first glass substrate has, as the air gap, a first recessed portion provided on a face side facing the second glass substrate, and the first patch antenna is provided on a bottom face of the first recessed portion.

(8)

The antenna device according to (7) above, in which a boundary portion between an inner side face of the first recessed portion and the bottom face of the first recessed portion is rounded.

(9)

The antenna device according to any one of (1) to (6) above, in which the second glass substrate has, as the air gap, a second recessed portion open to a face side facing the first glass substrate, and the second patch antenna is provided on a side opposite to the bottom face of the second recessed portion.

(10)

The antenna device according to (9) above, in which the second glass substrate has a protrusion provided on the bottom face of the second recessed portion.

(11)

The antenna device according to (9) or (10) above, in which a boundary portion between an inner side face of the second recessed portion and the bottom face of the second recessed portion is rounded.

(12)

The antenna device according to (9) above, in which the second recessed portion is provided in plural numbers, and the plural second recessed portions have an aspect ratio equal to or higher than three but equal to or lower than eight.

(13)

The antenna device according to any one of (1) to (12) above, in which the first glass substrate and the second glass substrate each have a thickness equal to or greater than 0.3 mm but equal to or smaller than 1.0 mm.

(14)

The antenna device according to any one of (1) to (13) above, in which the first antenna element includes a linear antenna provided on the first glass substrate.

(15)

A wireless communication apparatus including:

an antenna device; and a wireless communication circuit connected to the antenna device, in which the antenna device includes a first antenna element, and a second antenna element arranged on one face side of the first antenna element, the first antenna element includes a first glass substrate, and a first patch antenna provided on the first glass substrate, the second antenna element includes a second glass substrate, and a second patch antenna provided on the second glass substrate, and at least part of the first patch antenna faces the second patch antenna with an air gap interposed therebetween.

(16)

Mobile equipment, an automobile, or a building part, including the wireless communication apparatus.

REFERENCE SIGNS LIST

1, 1A, 1B, 1C, 1D, 1E, 1F, 1G: Antenna device
5: Communication circuit board
10, 10A, 10B, 10C, 10D, 10F, 10G: First antenna element
11: First glass substrate
11*a*, 21*a*: Front face
11*b*, 21*b*: Rear face
11H1: First through-hole
11H2: Second through-hole
11H3: Third through-hole
12*a*: Bottom face
13: First patch antenna
13A, 15A, 17A, 18A: Cu layer
13B, 15B, 17B, 18B: Ni layer
13C, 15C, 17C, 18C: Au layer
15: Conductor layer
17: Terminal layer
18: Connection layer
19*a*, 19*b*, 29: Copper
20, 20A, 20B, 20D, 20E, 20F: Second antenna element
21: Second glass substrate
23: Second patch antenna
25, 111: Recessed portion
25*a*, 111*a*: Bottom face
25*b*, 111*b*: Inner side face
25*c*, 111*c*: Boundary portion
30: Joining material
50: Wireless communication circuit
51: Input terminal
52: Transmission amplifier
53: Switch
54: Filter
55: Phase shifter
56: Reception amplifier
57: Output terminal
100, 100A, 100B, 100C, 100D, 100E, 100F: Wireless communication apparatus
121: First positioning mark
131: End fire antenna
160: Dipole antenna
161: First conductor layer
162: Second conductor layer
163: Third conductor layer
164: Fourth conductor layer
171: Terminal layer
221: Second positioning mark
241: Protrusion
251: Slit
FP1: First feeding point
FP2: Second feeding point

The invention claimed is:

1. An antenna device, comprising:

a first antenna element; and a second antenna element on a face side of the first antenna element, wherein the first antenna element includes a first glass substrate, and a first patch antenna on the first glass substrate, the second antenna element includes a second glass substrate, and a second patch antenna on the second glass substrate, the second glass substrate includes, as an air gap, a second recessed portion open to a face side of the second glass substrate facing the first glass substrate, the second patch antenna is on a side opposite to a bottom face of the second recessed portion, and at least a part of the first patch antenna faces the second patch antenna with the air gap interposed therebetween.

2. The antenna device according to claim 1, wherein the first glass substrate and the second glass substrate each have transparency.

3. The antenna device according to claim 2, wherein the first antenna element further includes a first positioning mark on the first glass substrate, the second antenna element further includes a second positioning mark on the second glass substrate, and the first positioning mark overlaps with the second positioning mark in a top plan view.

4. The antenna device according to claim 1, wherein the first antenna element further includes a first feeding point connected to the first patch antenna, and a second feeding point connected to the first patch antenna at a location spaced from the first feeding point.

5. The antenna device according to claim 4, wherein the first feeding point and the second feeding point are connected to impedances having equal sizes.

6. The antenna device according to claim 1, wherein the first glass substrate includes a conductor layer that is on a side opposite to the first patch antenna across the first glass substrate and fixed to an optional potential.

7. The antenna device according to claim 1, wherein the first glass substrate includes, as the air gap, a first recessed portion on a face side of the first glass substrate facing the second glass substrate, and the first patch antenna is on a bottom face of the first recessed portion.

8. The antenna device according to claim 7, wherein a boundary portion between an inner side face of the first recessed portion and the bottom face of the first recessed portion is rounded.

9. The antenna device according to claim 1, wherein the second glass substrate further includes a protrusion on the bottom face of the second recessed portion.

10. The antenna device according to claim 1, wherein a boundary portion between an inner side face of the second recessed portion and the bottom face of the second recessed portion is rounded.

11. The antenna device according to claim 1, wherein the second glass substrate further includes a plurality of second recessed portions, and the plurality of second recessed portions has an aspect ratio equal to or higher than three but equal to or lower than eight.

12. The antenna device according to claim 1, wherein the first glass substrate and the second glass substrate each have a thickness equal to or greater than 0.3 mm but equal to or smaller than 1.0 mm.

13. The antenna device according to claim 1, wherein the first antenna element further includes a linear antenna on the first glass substrate.

14. A wireless communication apparatus, comprising:

an antenna device; and a wireless communication circuit connected to the antenna device, wherein the antenna device includes a first antenna element, and a second antenna element on a face side of the first antenna element, the first antenna element includes a first glass substrate, and a first patch antenna on the first glass substrate, the second antenna element includes a second glass substrate, and a second patch antenna on the second glass substrate, the second glass substrate includes, as an air gap, a second recessed portion open to a face side of the second glass substrate facing the first glass substrate, the second patch antenna is on a side opposite to a bottom face of the second recessed portion, and at least a part of the first patch antenna faces the second patch antenna with the air gap interposed therebetween.

* * * * *